(12) United States Patent
Akagami et al.

(10) Patent No.: US 6,623,165 B1
(45) Date of Patent: Sep. 23, 2003

(54) BEARING APPARATUS OF SEALING TYPE

(75) Inventors: Kazuo Akagami, Kanagawa (JP); Tomoyuki Aizawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/680,687

(22) Filed: Oct. 6, 2000

(30) Foreign Application Priority Data

| Oct. 8, 1999 | (JP) | 11-287921 |
| Dec. 28, 1999 | (JP) | 11-373110 |
| Feb. 17, 2000 | (JP) | 2000-045123 |
| Sep. 6, 2000 | (JP) | 2000-269762 |

(51) Int. Cl.$^7$ ............................................. F16C 33/80
(52) U.S. Cl. ........................ 384/477; 384/478; 384/485
(58) Field of Search ................................ 384/477, 478, 384/480, 481, 482, 484, 485, 486, 570, 571; 277/433, 348, 551

(56) References Cited

U.S. PATENT DOCUMENTS

| 3,627,390 A | * | 12/1971 | Irwin ............................ 384/478 |
| 3,642,335 A | * | 2/1972 | Takahashi et al. ............ 384/482 |
| 4,383,720 A | | 5/1983 | Ernst |
| 4,527,915 A | | 7/1985 | Ikariishi et al. |
| 4,572,516 A | * | 2/1986 | Symons et al. ................ 277/377 |
| 4,692,040 A | * | 9/1987 | Ebaugh et al. ................ 277/551 |
| 5,133,609 A | * | 7/1992 | Ishiguro ........................ 384/477 |

FOREIGN PATENT DOCUMENTS

| DE | 62 972 | 7/1968 |
| DE | 35 35 445 A1 | 4/1987 |
| DE | 199 00 125 A1 | 7/1997 |
| DE | 199 00 469 A1 | 8/1999 |
| EP | 0 117 267 A1 | 2/1983 |
| JP | 63-202239 | 8/1988 |
| JP | 1-94666 | 6/1989 |
| JP | 3-66963 | 10/1991 |
| JP | 6-82437 | 11/1994 |
| JP | 7-55012 | 3/1995 |
| JP | 7-83333 | 3/1995 |
| JP | 7-332376 | 12/1995 |
| JP | 2567274 | 12/1997 |
| JP | 2595260 | 3/1999 |
| JP | 11-257361 | * 9/1999 |
| JP | 2994206 | 10/1999 |

* cited by examiner

Primary Examiner—William C Joyce
(74) Attorney, Agent, or Firm—Sughrue Mion, PLLC

(57) ABSTRACT

When an inner race (12) rotates at a speed lower than a predetermined speed, a sealing body (27) contacts the sealingface part (21c), but when the inner race (12) rotates at a speed more than the predetermined speed, a contacting pressure to a sealing face part (21c) is reduced or the sealing body (27) is isolated so as to form a non-contacting seal, and therefore, for example, at the low speed, the sealing body (27) forms a contacting seal, thereby to compensate a low speed-low sealing ability of the non-contacting seal such as the labyrinth seal, and on the other hand, at high speed rotation, the sealing body (27) reduces the contacting pressure to the sealing face part (21c), and otherwise separates therefrom to form the non-contacting seal as the labyrinth seal, whereby it is possible to solve the problem of heating or abrasion at the contacting part. Further, a sleeve (122) is mounted on the supporting edge (12a) of the inner race (12), thereby to secure the sealing device (120) without processing a screwing hole in the inner race (12). Moreover, the sleeve (122) is optionally processed with a screwing hole (122a), to thereby easily fix the sealing device (120) by the bolt (124).

4 Claims, 24 Drawing Sheets

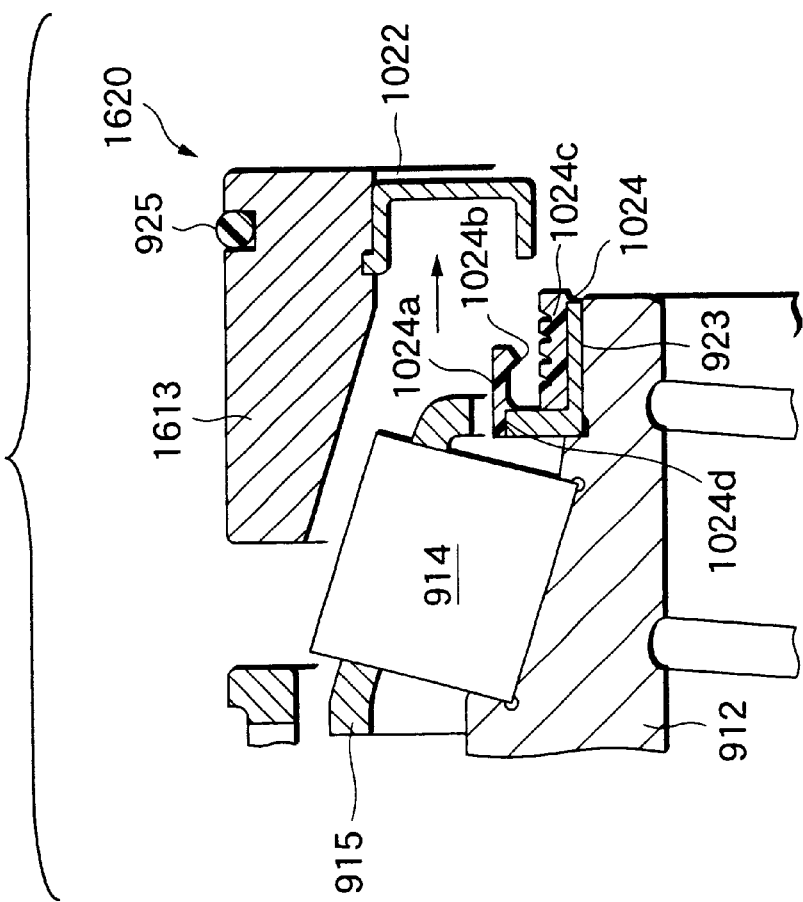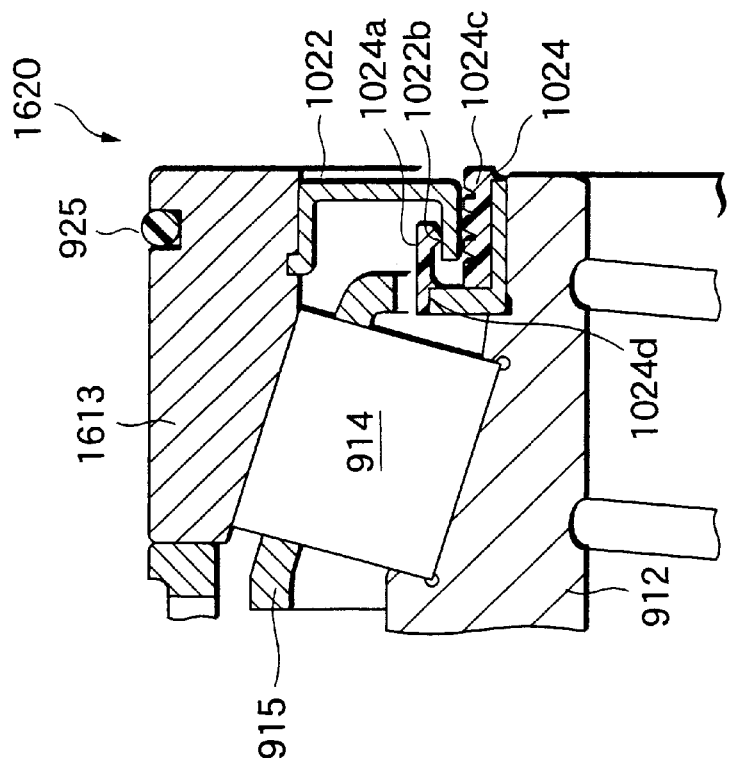

BEARING APPARATUS OF SEALING TYPE

BACKGROUND OF THE INVENTION

1. Field of the Invention

The present invention relates to a bearing apparatus of sealing type including roll neck bearings used, for example, in iron and steel facilities or rolling machines.

2. Description of the Related Art

As roll neck bearings to be used to work rolls of hot rolling machines, cold rolling machines or intermediate rolls, it is conventional to use tapered roller bearings in double-row or four-row capable of supporting large load.

In such rolling machines, much cooling water is supplied to the work rolls for precisely securing thickness of products and controlling shapes thereof. Accordingly, a sealing device is inherently required to the roll neck bearing for avoiding invasion of the cooling water into the interior of the bearing.

The sealing device equipped with a seal of contacting type as described in JP-A-6-82437U is, in general, broadly used, but has a problem of causing heat at a sliding face of the seal. In particular since a high speed operation of rolling machines has recently been designed for background of increasing productivity, relatively large clearances or gaps in an interior of the bearings have been made, taking thermal expansion into consideration. However, an eccentric amount in the seal of the contacting type of the sealing device is therefor increased, resulting to lower the sealing ability or increase heat in the seal sliding face so that the contacting seal is worn or damaged at an earlier period. Further, though heat resistance of the contacting seal may be considered to improve it, a new problem arises that cost will be heightened.

On the other hand, there is a sealing device provided with a seal of non-contacting type such as labyrinth seal as described in JP-B-3-66963. Being without the sliding part, the sealing device of such type has no problem of heating the seal and may comply with the rolling machine operated at high speed, but when operated at relatively low speed, the labyrinth effect, which makes use of a centrifugal force, is compromised.

In a case of the non-contacting seal as the labyrinth seal, for inspecting the interior of the bearing and supply grease, the labyrinth seals are generally fixed at inner and outer races on the circumference with may bolts, to thereby assemble and disassemble them. This case, however, increases the number of parts, is complicated in a structure of the sealing device, and assembling and disassembling procedures are inefficient.

SUMMARY OF THE INVENTION

Accordingly, in view of such problems as mentioned, it is an object of the invention to provide a compact bearing apparatus of sealing type enabling to comply with machines to be driven a high speed, while heightening the sealing ability at low speeds.

In view of such problems as mentioned, it is another object of the invention to provide a bearing apparatus of sealing type enabling to heighten the sealing ability though at low cost and having excellent assembling and disassembling ability.

To solve the above object, there is provided a bearing apparatus of sealing type, comprising: tapered rollers disposed in four rows and a sealing body comprising an elastic material, which contacts a sliding face of a seal when the bearing apparatus rotates at low speed and does not contact the sliding face or reduces a contacting pressure by deformation due to a centrifugal force when the bearing apparatus rotates at high speed.

The bearing apparatus of sealing type according to the invention is incorporated with the tapered rollers disposed in four rows and the sealing body comprising an elastic material which contacts a sliding face of the sealing body at low speed, and does not contact the sliding face or reduces a contacting pressure by deformation due to a centrifugal force acting on itself at high speed. Therefore, for example, the elastic material contacts the sliding face at low speed so as to form a contacting seal, thereby to compensate a low speed-low sealing ability of the non-contacting seal such as the labyrinth seal, and on the other hand, at high speed, the elastic material lowers the contacting pressure by deformation due to the centrifugal force, otherwise the non-contacting seal as the labyrinth seal is formed by the non-contacting condition, whereby it is possible to solve the problem of heating or abrasion at the contacting part.

In addition to the above seal, a combination with the non-contacting seal is preferable. The seal and the non-contacting seal may be one or plural.

In addition, the bearing apparatus of the invention comprises an inner race having a holding face, an outer race, a rolling member rotatably arranged between the inner and outer races, a sealing body for sealing a space between the inner and outer races, and a holding member detachably holding the sealing body. Accordingly, the holding member is fitted into the holding face of the inner race, to thereby secure the equipment of the sealing device, without processing a screwing hole for equipping the sealing device to the inner race. As the holding member can be optionally processed with the screwing hole, the sealing device may be secured thereto by means of, e.g., screws.

It is preferable that the sealing body is devised to fit into, e.g., the holder, so that a handling property is excellent.

Moreover, the bearing apparatus according to the invention comprises an inner race, an outer race, rolling members rotatably arranged between the inner and outer races, and the sealing device for sealing a space between the inner and outer races. The sealing device comprises an outer race member and an inner race member encircled by the outer race member, and a sealing unit disposed between the inner and outer race members. The sealing unit comprises a projection part furnished to the inner race member and formed continuously in the circumferential direction and a sealing face part furnished to the outer race member and extending in the circumferential direction. The projection part contacts the sealing face part, when the inner race member rotates at a speed lower than the predetermined speed, but when the inner race member rotates at a speed more than the predetermined speed, the projection part reduces the contacting pressure to the sealing face part or separates from the sealing face part so as to form a non-contacting seal in relation with the sealing face part. Thus, for example, the projection part contacts the sealing face part to form the contacting seal at low speed, thereby to compensate the low speed-low sealing ability of the non-contacting seal such as the labyrinth seal, and on the other hand, at high speed, the projection part lowers the contacting pressure to the sealing face part, otherwise the non-contacting seal as the labyrinth seal is formed by separating therefrom, whereby it is possible to solve the problem of heating or abrasion at the contacting part. If the projection part is positioned at a side of the interior space of the bearing with respect to the sealing face part, the projection part does not disturb approach and separation of the sealing face part when assembling or disassembling, and therefore the bearing apparatus having the excellent assembling and disassembling abilities may be offered.

Herein, the term of "non-contacting seal" is defined by a seal having such function as the labyrinth seal that foreigners as a water adhered to the projection part are thrown to a side of the sealing face part by a shaking-off effect making use of the centrifugal force to thereby exhaust them outside. The outer race member may be integrally formed with the outer race or separated therefrom, and the inner race member may be integrally formed with the inner race or separated therefrom.

Further, it is preferable that the outer race member is provided with a drain passage, whereby a draining effect is heightened.

Still further, it is preferable that the outer race member is defined with a circumferential groove in the edge of the bearing of outer race member, to thereby prevent a water from entering the interior of the bearing from the edge of the bearing.

Moreover, it is preferable that the sealing part of the sealing device is formed in a cylindrical shape.

BRIEF DESCRIPTION OF THE DRAWINGS

FIGS. 14A and 14B are enlarged views of a part corresponding to the part II of FIG. 1 according to a ninth embodiment, in which FIG. 14A is a view showing a state that a sealing device 920 is incorporated, and FIG. 14B is a view showing a state that the same is disassembled;

FIG. 15A is a view showing a state that a sealing device 1020 is incorporated, and FIG. 15B is a view showing a state that the same is disassembled;

FIG. 21A shows a state at low speed, and FIG. 21B shows a state at high speed;

FIGS. 22A and 22B are cross sectional views similar to FIGS. 15A and 15B according to a sixteenth embodiment, and FIG. 22A is a view showing a state that a sealing device 1620 is incorporated, and FIG. 22B is a view showing a state that the sealing device 1620 is disassembled;

FIG. 26A is a view showing a state that a sealing device 1720 is incorporated, and FIG. 26B is a view showing a state that the sealing device 1720 is disassembled;

DETAILED DESCRIPTION OF THE PREFERRED EMBODIMENTS

An explanation will be made in detail to modes for carrying out the invention with reference to the attached drawings.

Figure 1:
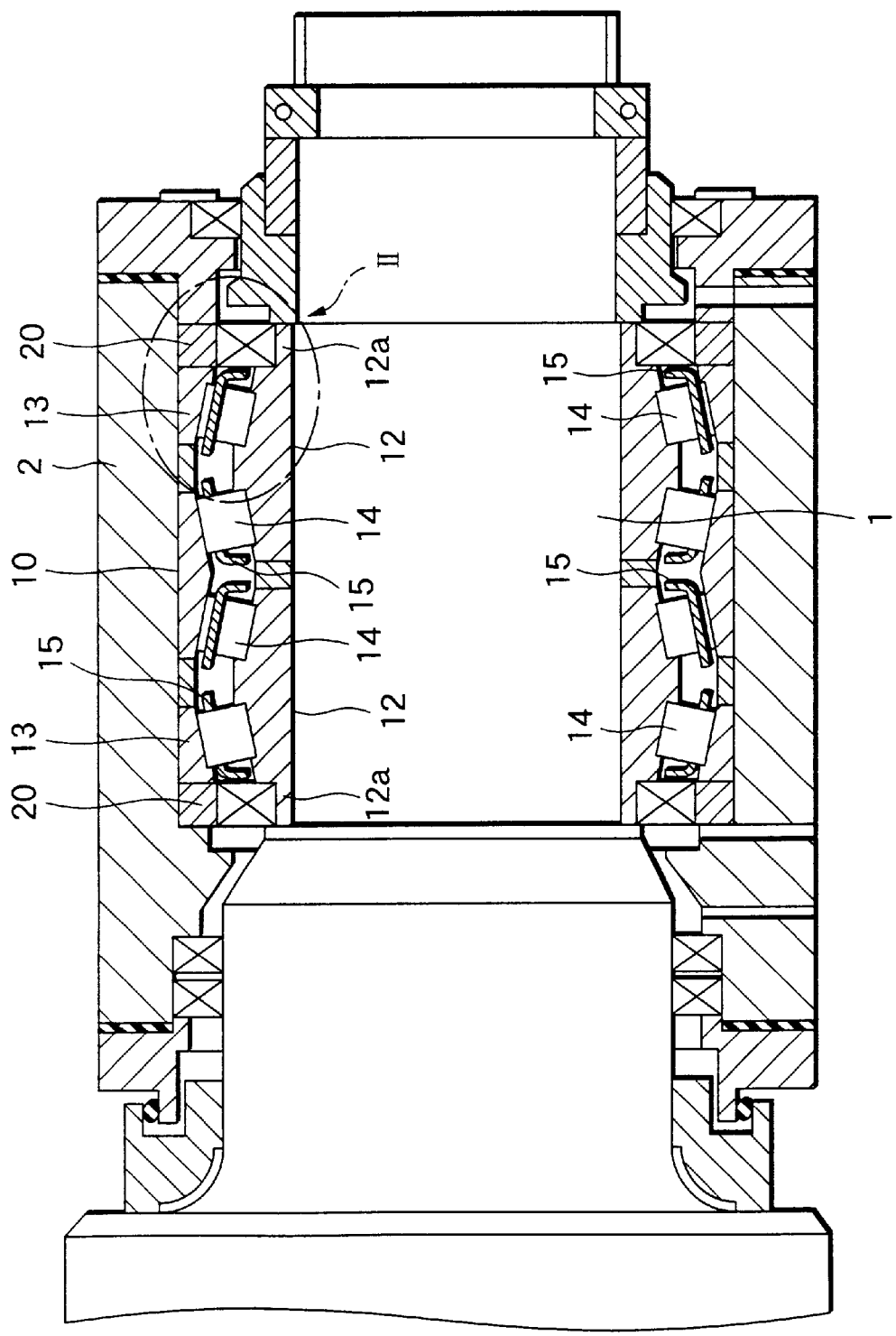
FIG. 1 is a cross sectional view showing the periphery around the edge part of a work roll of a rolling machine supported by the bearing apparatus according to a first invention.

FIG. 1 is a cross sectional view showing the periphery around the edge part of the work roll of the rolling machine supported by the bearing apparatus of sealing type according to the invention. In FIG. 1, a four-row tapered roller bearing 10 comprises an inner race 12 carrying a work roll 1 of the rolling machine and capable of being divided in an axial direction, an outer race 13 attached to a housing 2 and capable of being divided in the axial direction, tapered rollers 14 in four rows respectively disposed between the inner race 12 and the outer race 13, and holders 15 supporting the tapered rollers 14. At both sides of the bearing 10, sealing devices 20 are furnished. The bearing 10 and the sealing devices 20 compose the bearing apparatus. A pair of sealing devices 20 have the same structure, and an explanation will be made to the only sealing device 20 of the right side.

Figure 2:
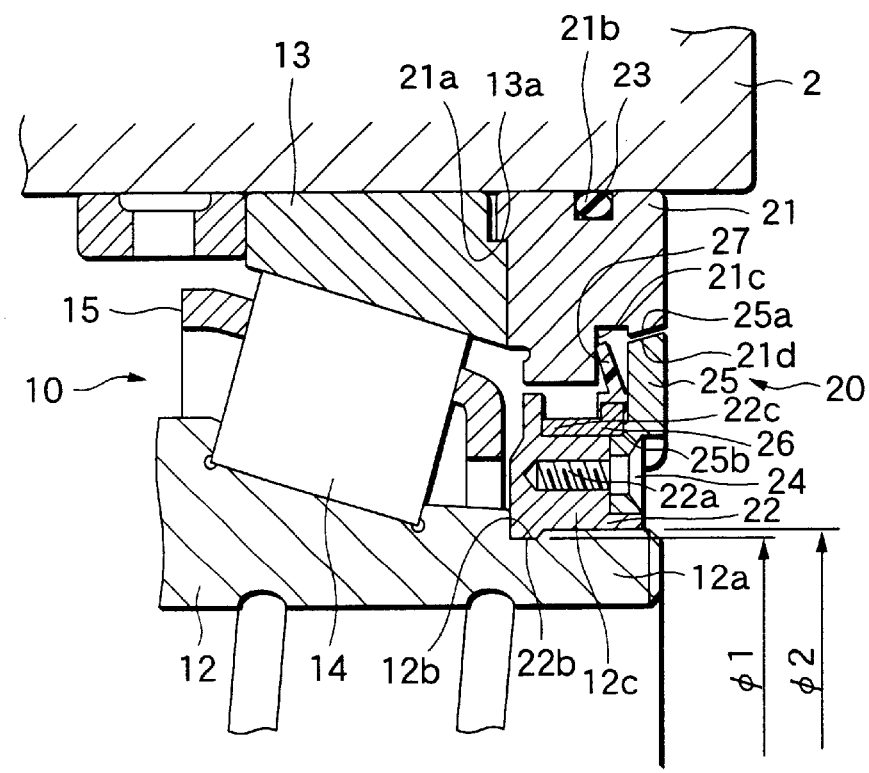
FIG. 2 is an enlarged view of a part II of FIG. 1.
Figure 3:
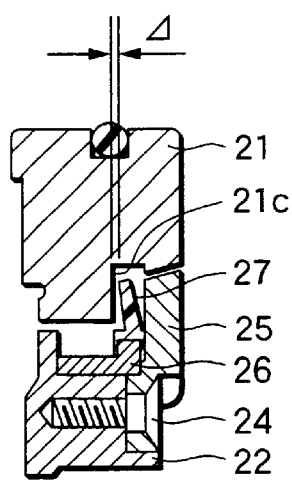
FIG. 3 is a view showing an only sealing device taken out from FIG. 2.

FIG. 2 is an enlarged view of a part II of FIG. 1. FIG. 3 is a view showing the sealing device taken out from FIG. 2, excepting a supporting edge 12a of the inner race 12. In FIG. 2, the sealing device 20 has a ring-shaped outer race holder 21 serving as an outer race member and a ring-shaped sleeve 22 encircled by the outer race holder 21. The outer race holder 21 is formed with a step portion 21a at a left edge, while the outer race 13 is formed at its right edge with a step portion 13a to oppose to the step portion 21a, and when assembling, the step portions 21a and 13a are engaged with each other.

Further, the outer race holder 21 has a circumferential groove 21b in the outer circumference, into which an O-ring 23 is positioned for sealing the clearance between the outer circumference of the outer race holder 21 and the inner circumference of the housing 2. The outer race holder 21 is defined in the inner circumference with a radial face 21c serving as a sealing face part continuous in the circumferential direction and a tapered face 21d facing outside (directing to the right) in its right side.

A sleeve 22 serving as a holding member attached at the outer circumference of the supporting edge 12a of the inner race 12 in such a later described manner, has a screw hole 22a extending laterally at its right side surface. A substantially disk-shaped holder 25 is furnished at the right side surface of the sleeve 22 by means of a screw 24 engaged with the screw hole 22a.

In the outer circumference of the holder 25, a tapered face 25a is formed to oppose to a tapered face 21d of the outer race holder 21 with a small clearance. Thus, the tapered face 21d of the outer race holder 21 and the tapered face 25a of the holder 25 define a labyrinth seal. The left face in the vicinity of the outer circumference of the holder 25 contacts a flange part of a core metal 26 of L-shaped cross section attached to the outer circumference of the sleeve 22, to thereby restrain the core metal 26. The core metal 26 may be combined of two plane sheets instead of the L-shaped member. More specifically, the sleeve 22 is formed in the outer circumference thereof with a step portion 22c, and the holder 25 is also formed with a step portion 25b at the left edge thereof to oppose to the step portion 22c. When the holder 25 is mounted on the sleeve 22, the step portion 22c and the step portion 25b are united to form a circumferential groove into which an inner circumference of the core metal 26 is fitted. Accordingly, the core metal 26 can be easily detachably attached by removing the holder 25 from the sleeve 22. On the outer edge of the core metal 26, a frustum-conical seal material (projection) 27 is adhered which is made of fluorine rubber, acrylic rubber or nitrile rubber (resin or plastic are sufficient). When the work roll 1 rotates at relatively low speed (including a rest state), the sealing body 27 extends obliquely as shown in FIG. 2 and contacts the radial face 21c at its outer circumference. The supporting edge 12a of the inner race 12, the sleeve 22, the holder 25 and the core metal 26 compose the inner race member. In addition, the sealing body 27 and the radial face 21c serving as a sealing face part compose a sealing member.

In FIG. 2, an outer circumferential small diameter part (concave portion) 12b having a diameter ø1 and a width of approximately ⅓ of the supporting member 12a is formed in the left side at the supporting edge 12a of the inner race 12.

In the inner circumference of the sleeve 22, an inner circumferential small diameter part (convex portion) 22b of a diameter ø1 is formed to oppose to the outer circumferential small diameter part 12b. On the other hand, an outer circumferential large diameter part 12c having a slightly larger diameter ø2 than the diameter ø1 is formed at the right side of the outer circumferential small diameter edge part 12b of the supporting edge 12a, whereby the sleeve 22 is prevented from slipping off. Incidentally, in stead of such configurations depending on concave and convex, fitting with pressure or engaging may be also available. The supporting edge 12a composes a holding face with its outer circumference.

Further, a description will be given of the working of this embodiment. When the work roll 1 of the rolling machine rotates together with the inner race 12, the tapered roller 14 rotates between the inner race 12 and the outer race 13, so that the work roll 1 may be rotatably supported to the housing 2.

In such cases, much cooling water is applied to the circumference of the work roll 1, and probably splashes outside (right side) of the sealing device 20 shown in FIG. 2. A major part of the cooling water is prevented from invasion into the bearing 10 by means of the holder 25 and the like, but some part goes into the interior through the labyrinth seal between the tapered face 21d of the outer race holder 21 and the tapered face 25a of the holder 25.

When the work roll 1 rotates together with the inner race 12 at a speed lower than a predetermined speed, that is, at the low speed, since the sealing body 27 is maintained under the condition of contacting the radial face 21c as shown in FIG. 2, a contacting seal is formed therebetween, to thereby prevent foreigner as water from entering the bearing 10. When the inner race 12 rotates at the low speed, even if the sealing body 27 and the radial face 21c contact, it only forms the contacting seal as the conventional art, and it is therefore considered that any especial problems do not occur as increasing of heating or abrasion at an earlier period.

In contrast, when the work roll 1 rotates together with the inner race 12 at a speed faster than the predetermined speed, that is, at the high speed, the sealing body 27 is deformed by a centrifugal force acting on itself, and the sealing body 27 is maintained in a state that it is separated by a distance Δ from the radial face 21c as shown in FIG. 3. Accordingly, a non-contacting seal such as the labyrinth seal is formed between the sealing body 27 and the radial face 21c, so that, based on a so-called shaking-off effect, foreigners as the water adhered to the sealing body 27 are thrown away to the radial face 21c by the centrifugal force. Thus, problems as heating or abrasion which would occur in the contacting seal are avoided, while the non-contacting seal functions to prevent foreigners from entering the bearing 10. Foreigners as the water thrown away to the radial face 21c are discharged outside via the clearance between the tapered faces 21d and 25a positioned at the lower part of the outer race holder 21. Even if the sealing body 27 contacts the radial face 21c when the speed is increased, the centrifugal force acting on the sealing body 27 more reduces the seal contacting pressure and restrains the heating of the seal caused by sliding, thereby enabling to prevent damages of the seal.

Figure 4A:
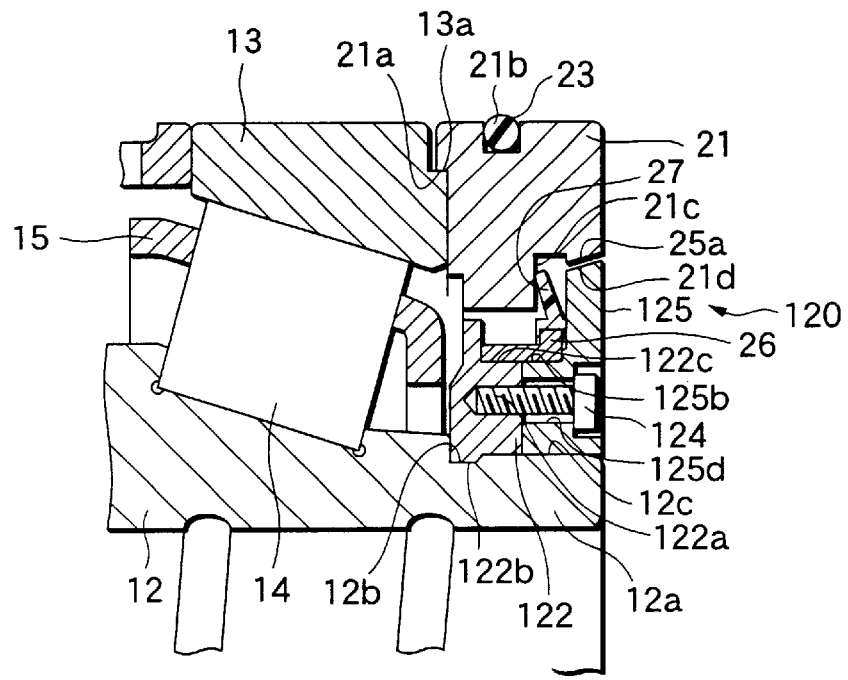
FIG. 4A is a cross sectional view similar to FIG. 2 according to a second embodiment.
Figure 4B:
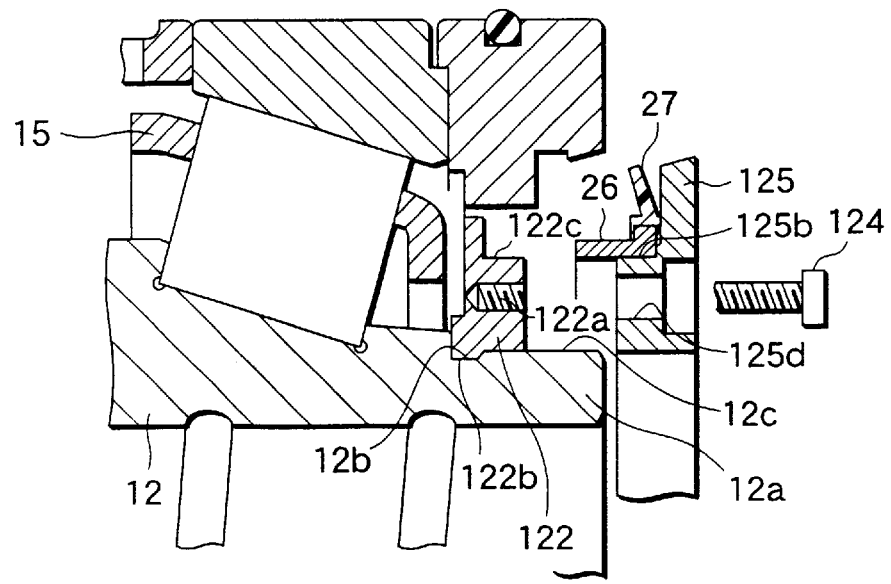
FIG. 4B is a view similar to FIG. 4A, showing a state that a holder 125 and a sealing body 27 are taken out.

FIG. 4A is a cross sectional view similar to FIG. 2 of the second embodiment, and FIG. 4B is a view similar to FIG. 4A, showing that the holder 125 is taken out together with the sealing body 27 and the core metal 26. The second embodiment is, in view of the embodiment of FIG. 2, different only in shapes of a sleeve 122, a holder 125 and a bolt 124 in a sealing device 120. In regard to similar structures including the sealing body 27, the same reference numerals will be given to omit detailed reference.

As shown in FIG. 4A, in this embodiment, a length of the sleeve 122 in the axial direction is shorter than that of the holder 125 in the same. A step portion 125b of the holder 125 has a length in the axial direction enough to receive the core metal 26. The outer diameter of the step portion 125b is designed to be somewhat larger than that of a step portion 122c of the sleeve 122 for receiving the core metal 26 so as to have a large tightening margin for receiving the core metal 26. Instead of the bolt 24 having the frustum-conical head, the holder 125 is furnished by the bolt 124 of a cylinder head as a hexagon bolt. If the holder 125 is positioned by the outer circumference of the supporting edge 12a of the inner race 12, not by the sleeve 122, the sealing body 27 can be attached in the radial direction at desirable precision, resulting in simplifying shapes of parts to cost down. The supporting edge 12a of the inner race 12, the sleeve 122, the holder 125 and the core metal 26 compose the inner race member. In addition, the sealing body 27 and the radial face 21c serving as a sealing face part compose a sealing member similarly as above.

When assembling the sealing device 120, as shown in FIG. 4B, at first, an inner circumferential small diameter part 122b of the sleeve 122 serving as the holding member is fitted into the outer circumferential small diameter part 12b of the supporting edge part 12a of the inner race 12, and then, the holder 125 is assembled on the supporting edge part 12a in a state that the core metal 26 holding the sealing body 27 is mounted on the step portion 125b. Thus, the core metal 26 is fixedly fitted into a circumferential groove formed between the step portion 122c and the step portion 125b by contacting the step portion 125b with the step portion 122c of the sleeve 122. The bolt 124 is then inserted into a penetrating hole 125d of the holder 125 and screwed with a screwing hole 122a of the sleeve 122, whereby the sealing device 120 is assembled. For disassembling the sealing device 120, a reverse procedure is carried out.

According to the present embodiment, by mounting the sleeve 122 on the supporting edge part 12a of the inner race 12, the attaching of the sealing device 120 can be secured without the processing of a screwing hole for incorporating in the inner race 12. As the sleeve 122 is optionally processed with the screwing hole 122a, the sealing device 120 can be easily secured by means of the bolt 124. In this embodiment, the core metal 26 fitted to the outer circumference of the holder 125 can be removed together with the holder 125, and therefore, for example, at maintenance of the bearing apparatus, in such a case where the sleeve 122 must be taken out from the supporting edge part 12a by giving impact force, preferably the sealing body 27 is not damaged.

Figure 5:
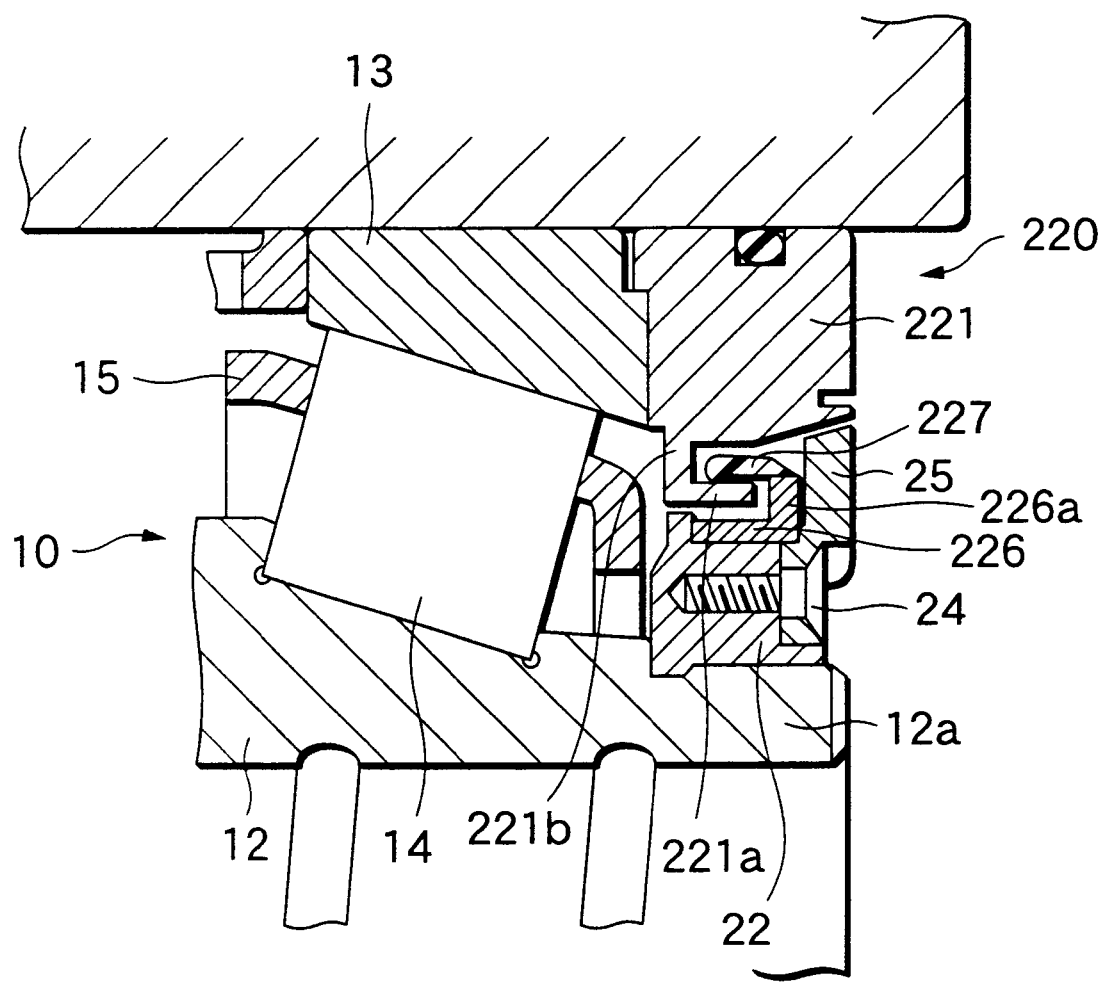
FIG. 5 is a cross sectional view similar to FIG. 2 according to a third embodiment.

FIG. 5 is a cross sectional view similar to FIG. 2 according to a third embodiment. The third embodiment is, in view of the embodiment shown in FIG. 2, different only in shapes of an outer race holder 221, a sealing body 227 and a core metal 226 in a sealing device 220. In regard to other similar structures, the same reference numerals will be given to omit detailed reference.

In FIG. 5, the outer race holder 221 includes a cylindrical part 221a having an axial length of almost half of the holder 221 and coaxially encircling the sealing body 227, and a flange part 221b communicating a left inner circumference of the outer race holder 221 and a left outer circumference of the cylindrical part 221a serving as a sealing face part. The core metal 226 attached to the outer circumference of the sleeve 22 has a flange part 226a relatively lengthily extending outside in a radial direction, and the cylindrical sealing body 227 provided at the circumference of the flange part 226a extends in the axial direction. The supporting edge 12a of the inner race 12, the sleeve 22, the holder 25 and the core metal 26 compose the inner race member. In addition, a sealing member is composed by the sealing body 227 and the outer circumference of the cylindrical 221a of the outer race holder 221 as the sealing face part.

When the work roll 1 (FIG. 1) rotates at relatively low speed (including the rest state), a sealing body 227 extends in the axial direction as shown in FIG. 5 and the inner circumference of the sealing body 227 contacts the outer circumference of the cylindrical 221a of the outer race holder 221. In such cases, the sealing body 227 and the cylindrical 221a form the contacting seal, to thereby prevent foreigners as the water from entering the bearing 10 side.

In contrast, when the work roll 1 rotates together with the inner race 12 at a speed faster than the predetermined speed, that is, at the high speed, the sealing body 227 is deformed by the centrifugal force acting on itself, and the sealing body 227 is maintained in a state that the left inner circumference thereof is separated from the outer circumference of the cylindrical part 221a. Accordingly, a non-contacting seal such as the labyrinth seal is formed between the sealing body 227 and the cylindrical 221a, so that, based on a so-called shaking-off effect, foreigners as the water invading in the sealing device 220 are thrown away to the inner circumference of the outer race holder 221 by the centrifugal force, problems as heating or abrasion which would occur in the contacting seal are avoided.

In the roll neck bearing for the rolling machine, the bearing is driven with a predetermined inner clearance. This clearance should be made large in order to avoid an impossible rotation of the bearing due to, in particular at high speed range, the negative clearance by difference in temperature between the inner and outer races. As the contact angle of the radial bearing for the roll neck is in general 0.17 to 0.30 5 rad, the axial clearance has magnification of approximately 3 to 6 times of the radial clearance. From this fact, with respect to seals to be used to bearings at high speed ranges, admissibility is required for large relative deviation of the inner and outer races in the axial direction. On the other hand, if the sealing body 227 has a cylindrical shape as shown in FIG. 5, not radial shape, the admissibility for the relative deviation of the inner and outer races in the axial direction is advantageously large.

Figure 6A:
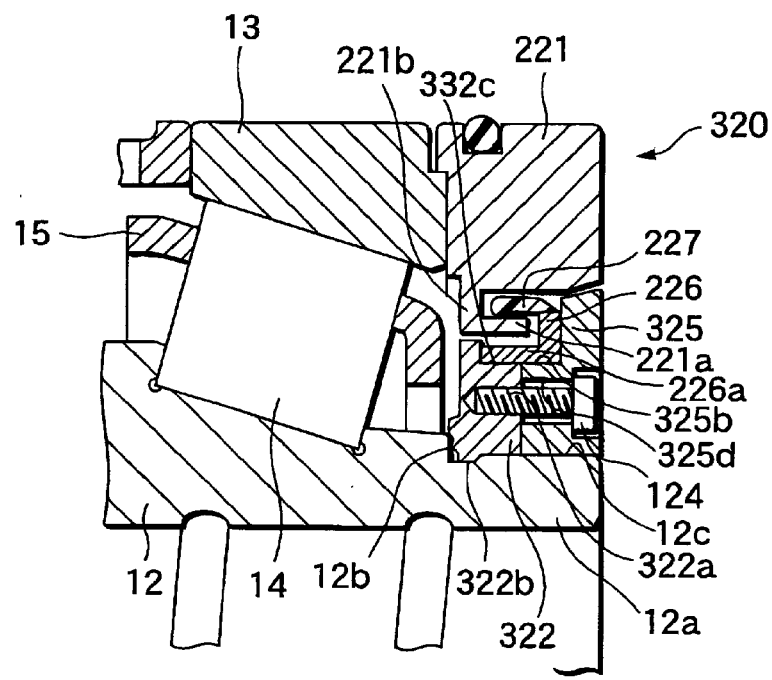
FIG. 6A is a cross sectional view similar to FIG. 5 according to a fourth embodiment.
Figure 6B:
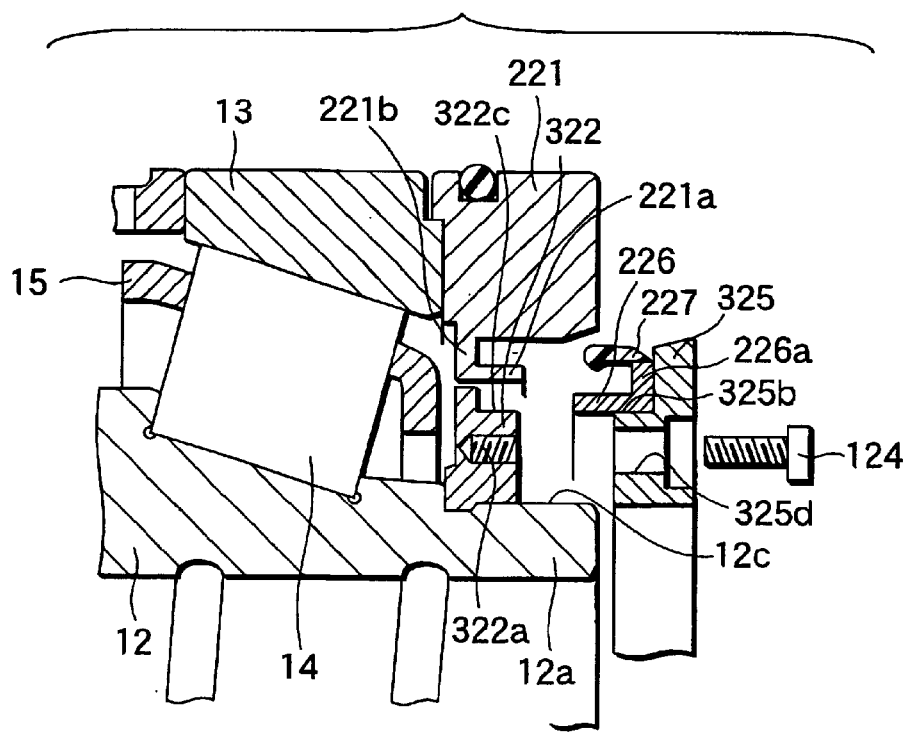
FIG. 6B is a view similar to FIG. 6A showing a state that a holder 325 and the sealing body 227 are removed.

FIG. 6A is a cross sectional view similar to FIG. 5 according to a fourth embodiment, and FIG. 6B is a view similar to FIG. 6A showing that the holder 325 is removed together with the sealing body 227 and the core metal 226. The fourth embodiment is, in view of the embodiment shown in FIG. 5, different only in shapes of a sleeve 322, a holder 325 and a bolt 124 in a sealing device 320. In regard to other similar structures, the same reference numerals will be given to omit detailed reference.

As shown in FIG. 6A, in the present embodiment, similarly to the embodiment shown in FIG. 4A, a length of the sleeve 322 in the axial direction is shorter than that of the holder 325 in the same. A step portion 325b of the holder 325 has a length in the axial direction enough to receive the core metal 226. The outer diameter of the step portion 325b is designed to be somewhat larger than that of a step portion 322c for receiving the core metal 226 of the sleeve 322 so as to have a large tightening margin for receiving the core metal 226. Instead of the bolt 24 having the frustum-conical head, the holder 325 is furnished by the bolt 124 of a cylinder head as a hexagon bolt. The supporting edge 12a of the inner race 12, the sleeve 322, the holder 325 and the core metal 326 compose the inner race member. In addition, the sealing body 227 and the outer circumference of the cylindrical part 221a of the outer race holder 221 serving as a sealing face part compose the sealing member.

When assembling the sealing device 320, as shown in FIG. 6B, at first, an inner circumferential small diameter part 322b of the sleeve 322 serving as the holding member is fitted into the outer circumferential small diameter part 12b of the supporting edge part 12a of the inner race 12, and then, the holder 325 is assembled on the supporting edge part 12a in a state that the core metal 226 holding the sealing body 227 is mounted on the step portion 325b. Thus, the core metal 226 is fixedly fitted into a circumferential groove formed between the step portion 322c and the step portion 325b by contacting the step portion 325b with the step portion 322c of the sleeve 322. This time, the sealing body 227 contacts, with its inner circumference at the left edge, the outer circumference of the cylindrical part 221a of the outer race holder 221. The bolt 124 is then inserted into a penetrating hole 325d of the holder 325 and screwed with a screwing hole 322a of the sleeve 322, whereby the sealing device 320 is assembled. For disassembling the sealing device 320, a reverse procedure is carried out.

According to the present embodiment, by mounting the sleeve 322 on the supporting edge part 12a of the inner race 12, the attaching of the sealing device 320 can be secured without the processing of a screwing hole for incorporating in the inner race 12. As the sleeve 322 is optionally processed with the screwing hole 322a, the sealing device 320 can be easily secured by means of the bolt 124.

Figure 7:
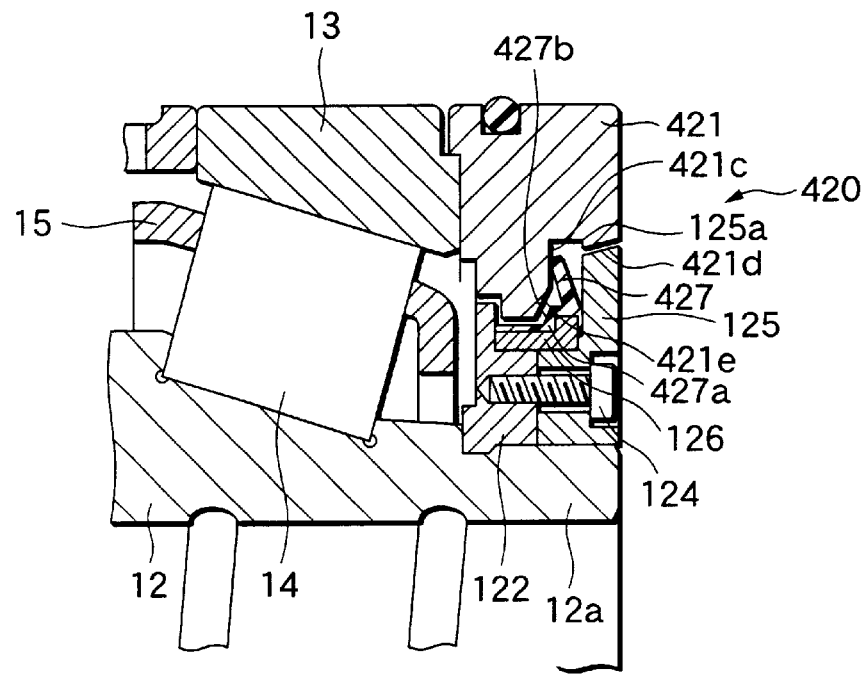
FIG. 7 is a cross sectional view similar to FIG. 2 according to a fifth embodiment.

FIG. 7 is a cross sectional view similar to FIG. 2 according to a fifth embodiment. The sealing device 420 of the fifth embodiment is, in view of the embodiment shown in FIG. 4, different only in shapes of an outer race holder 421, and a sealing body 427. In regard to other similar structures, the same reference numerals will be given to omit detailed reference.

In FIG. 7, a sealing body 427 has a base part 427a applied to the outer circumference over the axial direction of the core metal 126, and the base part 427a is formed at one part thereof with a tapered face 427b. The outer race holder 421 is formed with a tapered face 421e to oppose to the tapered face 427b. The tapered face 421e of the outer race holder 421 and the tapered face 427b of the sealing body 427 from the labyrinth seal. The supporting edge 12a of the inner race 12, the sleeve 122, the holder 125 and the core metal 126 compose the inner race member. In addition, a sealing member is composed by the sealing body 427 and the radial face 421c of the outer race holder 421 as the sealing face part.

According to the present embodiment, in addition to the effects as mentioned above, the sealing ability can be more heightened by a new labyrinth seal formed between the tapered face 421e of the outer race holder 421 and the tapered face 427b of the sealing body 427 in addition to the labyrinth seal formed between the tapered face 421d of the outer race holder 421 and the tapered face 125a of the holder 125.

Figure 8:
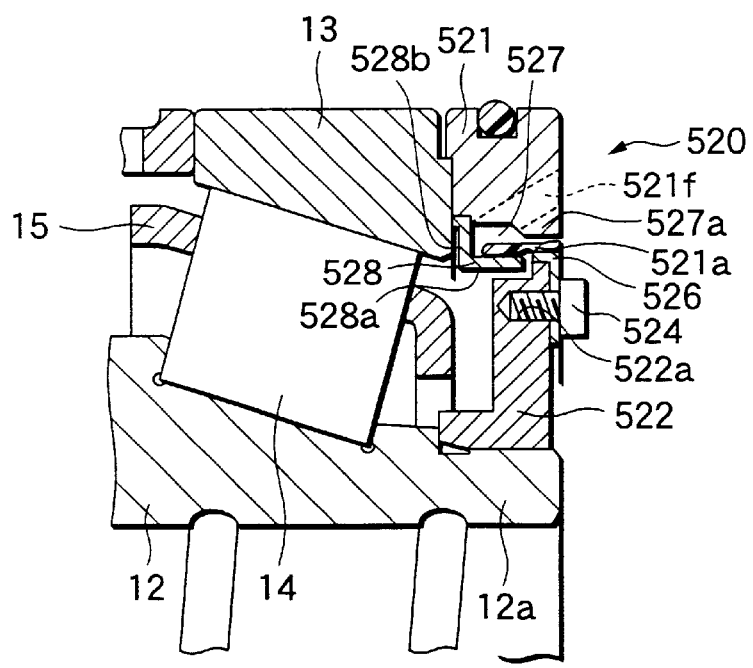
FIG. 8 is a cross sectional view similar to FIG. 2 according to a sixth embodiment.

FIG. 8 is a cross sectional view similar to FIG. 2 according to a sixth embodiment. With respect to the sealing device 520 of the sixth embodiment, in view of the embodiment shown in FIG. 6, the same reference numerals will be given to similar structures to omit detailed reference.

FIG. 8, a core metal 526 having a substantially L-shaped cross section is fitted into and mounted on the outer circumference of the supporting edge 12a of the inner race 12 by means of a bolt 624 screwed with a screwing hole 522a of the sleeve 522 similarly to the above embodiment. A cylindrical sealing body 527 is furnished on the outer circumference of the core metal 526, and the labyrinth seal is defined by a tapered face 521a of the outer race holder 521 and an opposite tapered face 527a formed in the sealing body 527. The supporting edge 12a of the inner race 12, the sleeve 522, and the core metal 526 compose the inner race member. In addition, a sealing member is composed by a sealing body 527 and the outer circumference of the cylindrical part 528a of a receiving metal 528 as the sealing face part.

The inner circumference of the outer race holder 521 is fitted with a flange part 528b of the receiving metal 528 having a L-shaped cross section, and an outer race member is composed with the outer race holder 521 and the receiving metal 528. A left edged inner circumference of the sealing body 527 contacts the outer circumference of the cylindrical part 528a of the receiving metal 528 serving as the sealing face part, to form a contacting seal. By providing a drain passage 521f (shown with a dotted line) at the lower part of the outer race holder 521, it is possible to heighten a discharging ability of such as water entering the inner circumference of the outer race holder 521.

According to the present embodiment, in addition to the effects of the embodiment shown in FIG. 6, the number of composing parts is reduced by omitting the holder 325, and the sealing apparatus 520 of lower cost may be offered. The length of the sealing apparatus 520 in the axial direction may be more shortened. Since the sealing position of the sealing body 527 can be determined outside of the radial direction with respect to the edge of the cage 15 coming near to the sealing position, interference of both elements can be prevented in the axial direction, and the length of the sealing apparatus 520 in the axial direction can be more shortened, and it is possible to make the bearing apparatus compact and increase a load capacity.

As the tapered face 527a of the sealing body 527 is made of the same rubber or resin material as the sealing body 527, even if any interference happens with an opposite outer race holder 521 when assembling, troubles such as damages of both may be prevented. Therefore, it is preferable that the clearance between the tapered face 527a of the sealing body 527 and the tapered face 521a of the outer race holder 521 is smaller than clearances between other metallic materials.

Figure 9:
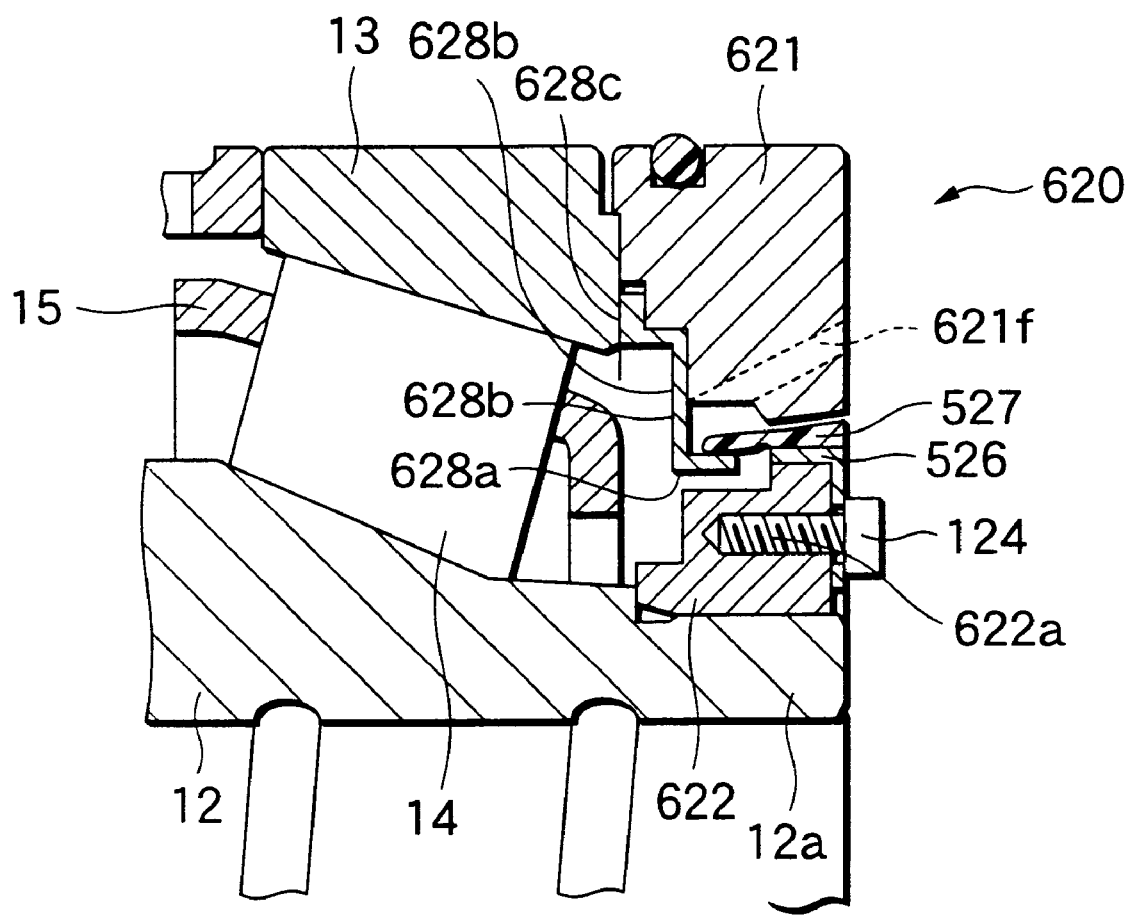
FIG. 9 is a cross sectional view similar to FIG. 2 according to a modification of the sixth embodiment.

FIG. 9 is a cross sectional view similarly to FIG. 2 according to the modification of the sixth embodiment. A sealing device 620 of this modification, accompanying with the enlarging of the flange part 628b of the receiving metal 628, is different only in reducing the size of a sleeve 622 and providing a mounting part 628c in the receiving metal 628 for the outer race holder 621 in view of the embodiment shown in FIG. 8. The sleeve 622 may be reduced advantageously in cost. By providing a drain passage 621f (shown with a dotted line) at the lower part of the outer race holder 621, it is possible to heighten a discharging ability of such as water entering the inner circumference of the outer race holder 621. The supporting edge 12a of the inner race 12, the sleeve 622, and the core metal 626 compose the inner race member. In addition, a sealing member is composed by a sealing body 527 and the outer circumference of the cylindrical part 628a of the receiving metal 628 serving as the sealing face part.

Figure 10:
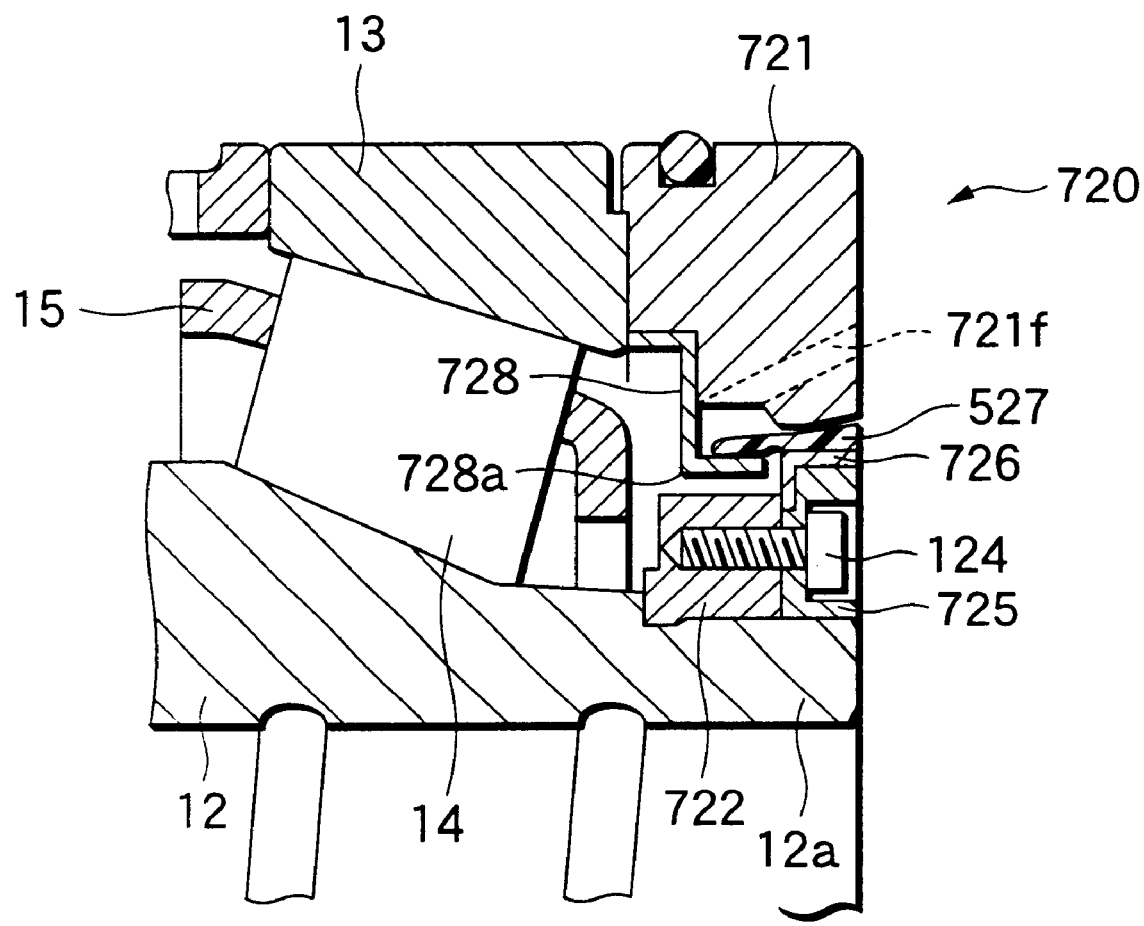
FIG. 10 is a cross sectional view similar to FIG. 2 according to a seventh embodiment.

FIG. 10 is a cross sectional view similar to FIG. 2 according to a seventh embodiment. With respect to the sealing device 720 of the seventh embodiment, in view of the embodiment shown in FIG. 6, the same reference numerals will be given to similar structures to omit detailed reference. Similarly to the above mentioned embodiment, by providing a drain passage 721f (shown with a dotted line) at the lower part of the outer race holder 721, it is possible to heighten a discharging ability of such as water entering the inner circumference of the outer race holder 721. In this embodiment, the holder 725 serves as the holding member and is fitted into the core metal 726 having the sealing body 527. The supporting edge 12a of the inner race 12, the sleeve 722, the holder 725 and the core metal 726 compose the inner race member. In addition, a sealing member is composed by the sealing body 527 and the outer circumference of the cylindrical part 728a of the receiving metal 728 serving as the sealing face part.

In the present embodiment, similarly to those of FIGS. 8 and 9, the receiving metal 728 made at low cost by the press forming is fittingly attached to the inner circumference of the outer race holder 721. Therefore, the provision of the cylindrical part 221a as the outer race holder 221 of FIG. 6 is no longer necessary, so that the workability is heightened and the sealing device 720 of lower cost may be offered. Further, even when the receiving metal 728 is worn due to usage of a long period, only the receiving metal 728 is exchanged, such that the outer race holder 721 is continuously applied to thereby reduce the running cost.

Figure 11:
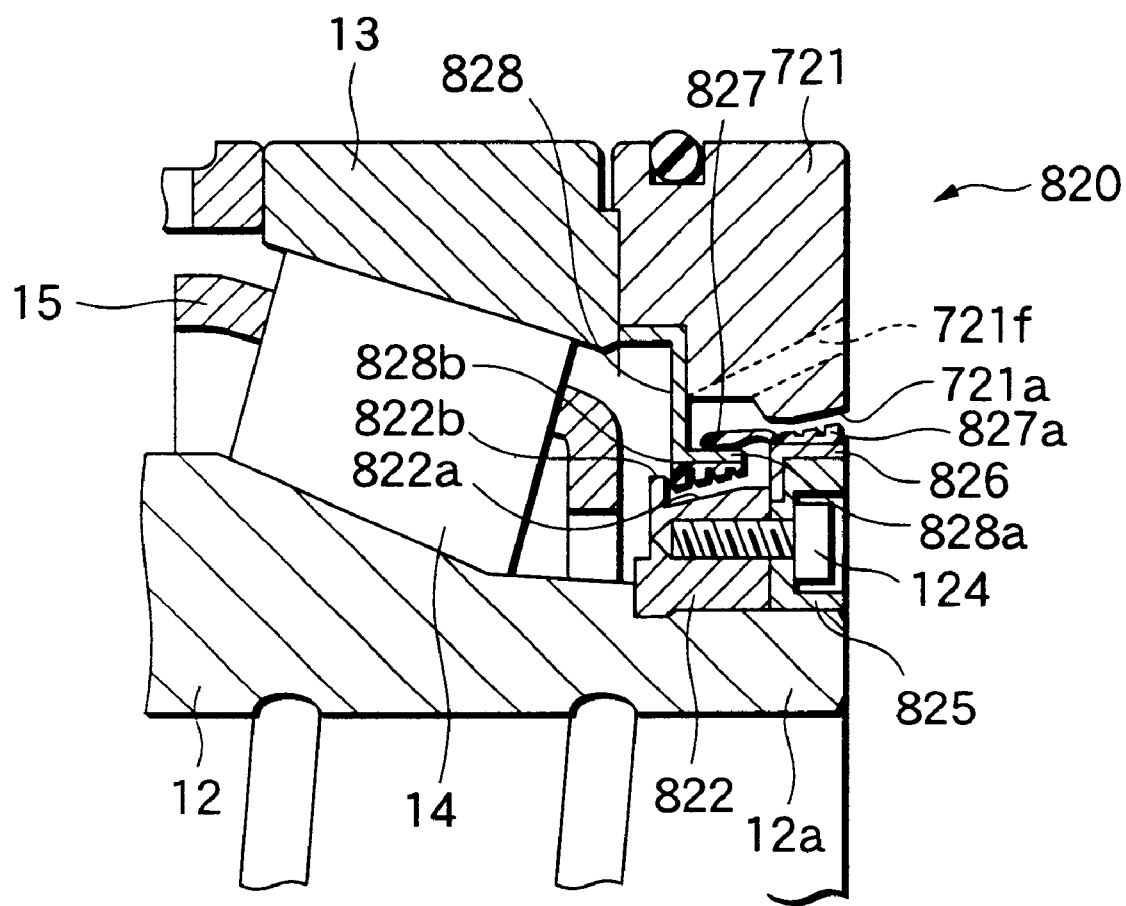
FIG. 11 is a cross sectional view similar to FIG. 2 according to an eighth embodiment.

FIG. 11 is a cross sectional view similar to FIG. 2 according to an eighth embodiment. With respect to a sealing device 820 of the eighth embodiment, in view of the embodiment shown in FIG. 10, the same reference numerals will be given to similar structures to omit detailed reference.

This embodiment has a similar structure to the embodiment of FIG. 10, and is mainly different in structures of the sleeve 822, the core metal 826, the sealing body 827 and the receiving metal 828. Specifically, a tapered face 822a and a flange part 822b are formed in the outer circumference of the sleeve 822. On the other hand, in the inner circumference of the cylindrical part 828a of the receiving metal 828, there are formed four ring-shaped parts 828b different in length corresponding to the tapered face 822a. Such ring-shaped parts 828b are formed by applying rubber or resin material to the receiving metal 828.

Further, in the outer circumference of the core metal 826 fitted into the holder 825 serving as the holding member, there are disposed three ring-shaped parts 827a comprising one part of the sealing body 827 so as to correspond to the tapered face 721a of the outer race holder 721. The supporting edge 12a of the inner race 12, the sleeve 822, the holder 825 and the core metal 826 compose the inner race member. In addition, a sealing member is composed by the sealing body 827 and the outer circumference of the cylindrical part 828a of the receiving metal 828 serving as the sealing face part.

According to the present embodiment, in addition to the effects of the above mentioned embodiments, since the labyrinth seals are formed among the ring-shaped part 828b of the receiving metal 828, the tapered face 822a and the flange 822b of the sleeve 822 and between the ring-shaped part 827a of the outer circumference of the core metal 826 and the tapered face 721a of the outer race holder 721, the sealing ability can be more heightened. The ring-shaped parts 828b, 827a are made of rubber or resin material, and even if any interference happens with an opposite metal material when assembling, troubles such as damages of both may be prevented. Therefore, it is preferable that the clearances between the ring-shaped part 828b and the tapered face 822a as well as the ring-shaped part 827a and the tapered face 821a are smaller than clearances between other metallic materials.

Figure 12:
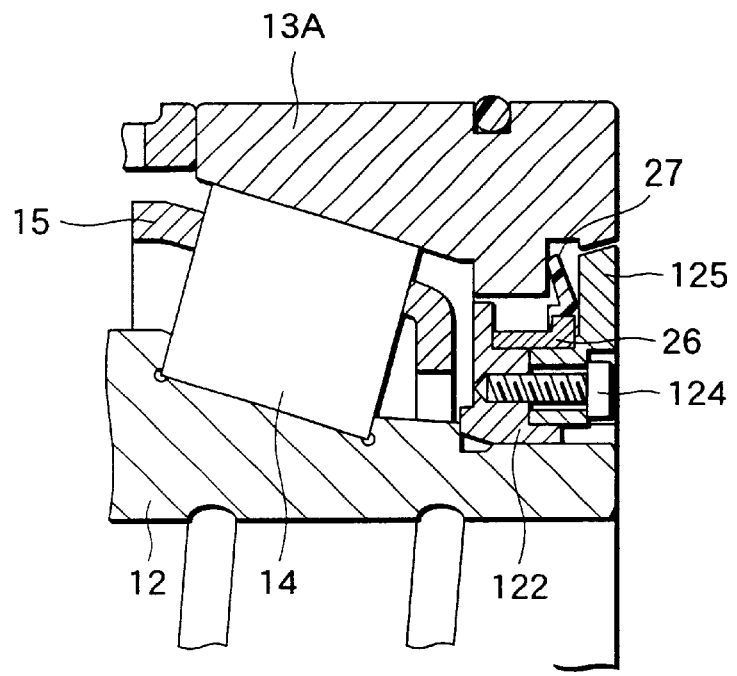
FIG. 12 is a cross sectional view similar to FIG. 2 according to a modification of the third embodiment.
Figure 13:
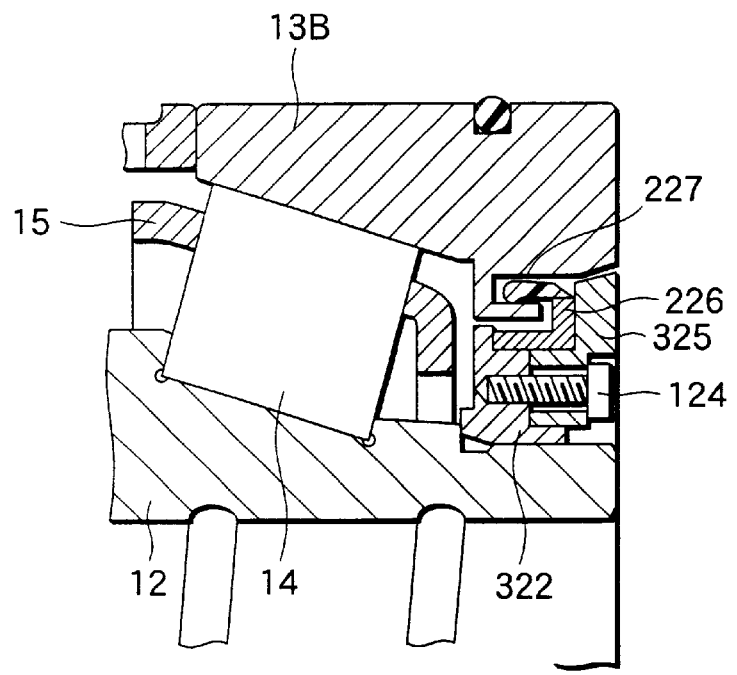
FIG. 13 is a cross sectional view similar to FIG. 2 according to a modification of the fourth embodiment.

Explanations have been made to the invention with reference to the embodiments, and of course, the invention should not be understood limiting thereto and may be appropriately modified or improved. For example, as modifications shown in FIGS. 12 and 13, the outer race holder serving as the outer race member may be united with the outer race. The modification shown in FIG. 12 is, in view of the embodiment shown in FIG. 4, different only in providing an outer race 13A made by uniting the outer race and the outer race holder. In regard to other similar structures, the same reference numerals will be given to omit detailed reference. The modification shown in FIG. 13 is, in view of the embodiment shown in FIG. 6, different only in providing an outer race 13B made by uniting the outer race and the outer race holder. In regard to other similar structures, the same reference numerals will be given to omit detailed reference.

Figure 14A:
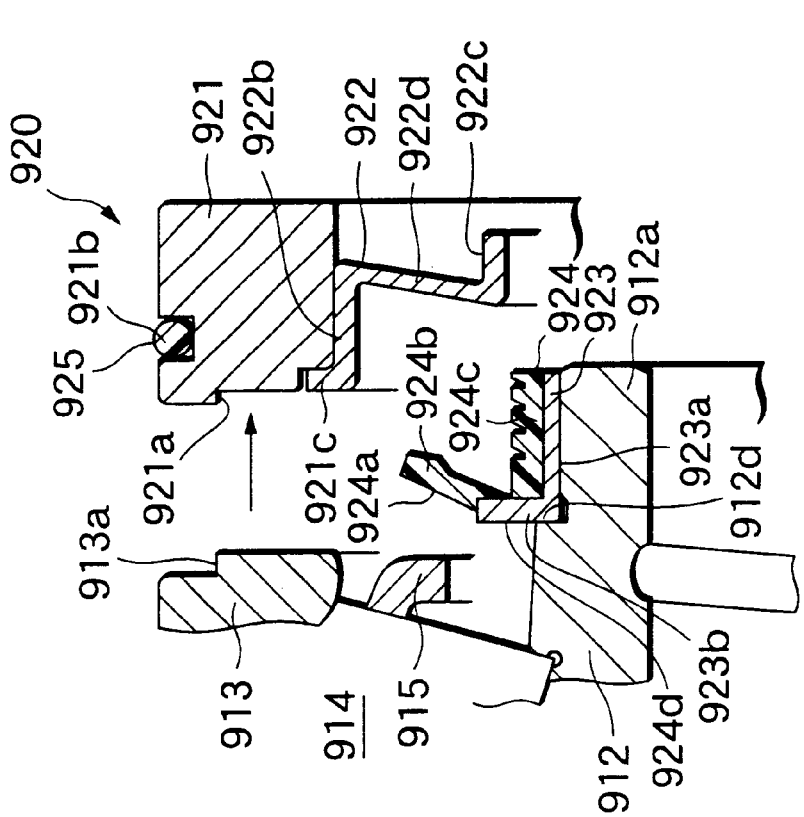
Figure 14B:
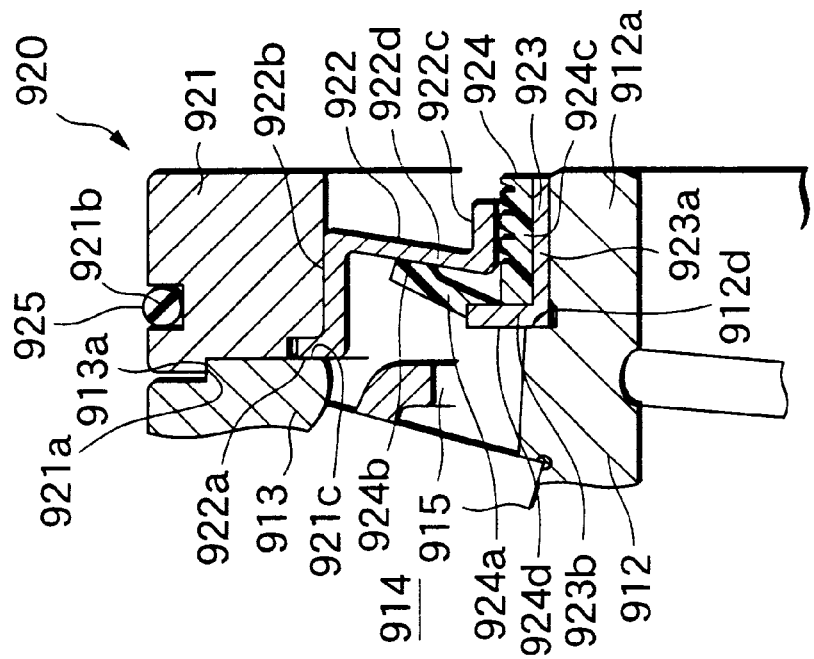

Another different embodiment will be explained with reference to the drawings. FIGS. 14A and 14B are enlarged views showing a part corresponding to the part II of FIG. 1 according to a ninth embodiment, and FIG. 14A is a view of assembling the sealing device 920, and FIG. 14B is a view of disassembling the same. In FIGS. 14A and 14B, a sealing device 920 is composed of a ring-shaped outer race holder 921 as the outer race member, a seal sliding member 922 furnished on the inner circumference thereof, a supporting edge 912a of the inner race 912 as the inner race member, the core metal 923 furnished on the outer circumference thereof, and the sealing body 924 provided to the core metal 923. The seal sliding member 922a and the sealing body 924 compose the sealing member.

At the left upper and lower parts of the outer race holder 921, a step portion 921a and a step portion 921c are formed.

On the other hand, at the right edge of the outer race 913, a step portion 913a is formed to oppose to the step portion 921a, and when assembling, the step portions 921a and 913a are engaged with each other.

The outer race holder 921 has a circumferential groove 921b in the outer circumference thereof, into which an O-ring 925 is disposed to seal the clearance between the outer circumference of the outer race holder 921 and the housing 2 (FIG. 1).

The seal sliding member 922 has a substantially Z-shaped cross section, and an upper bent part 922a thereof is inserted into the step portion 921c of the outer race holder 921, and is held between the outer race holder 921 and the edge of the outer race 913 in a state of assembling as shown in FIG. 14A. The seal sliding member 922 has a structure connecting, in series, a large cylindrical part 922b contacting with the inner circumference of the outer race holder 921 and a small cylindrical part 922c encircled by the large cylindrical part 922b via a sealing face part 922d.

The core metal 923 has a substantially L-shaped cross section, and includes a cylindrical part 923a furnished on the outer circumference of the supporting edge 912a of the inner race 912 and a flange part 923b extending toward outside of the radial direction along the step portion 912d formed in the inner race 912 from an edge of the cylindrical part 923a at a side of the tapered roller 914. A sealing lip part 924a having a tapered shape extends toward the sealing face part 922d of the seal sliding member 922 from the outer edge in the radial direction of the flange part 923b. At the outer edge in the radial direction of the sealing lip part 924a, a projection part 924b is formed continuously in the circumferential direction. When the work roll 1 (FIG. 1) rotates at a relatively low speed (including the rest state), the sealing lip part 924a extends obliquely as shown in FIG. 14A to cause the projection part 924b to contact the sealing face part 922d. A fulcrum 924d supporting the projection part 924b is positioned at the side of the tapered roller 914 compared with a contacting position of the projection part 924b and the sealing face part 922d.

In the outer circumference of the cylindrical part 923a of the core metal 923, a labyrinth part 924c defined with four circumferential grooves is formed. A labyrinth seal is formed between the labyrinth part 924c and the small cylindrical part 922c of the seal sliding member 922 which opposes to the labyrinth part 924c and is shorter in length of the axial direction than the labyrinth part 924c. A sealing body 924 is formed by the sealing lip part 924a and the labyrinth part 924c made of fluorine rubber, acrylic rubber or nitrile rubber (resin or plastic are sufficient). The sealing lip part 924a and the labyrinth part 924c may be united or separated. An attaching part of the sealing lip part 924a and the flange part 923b is a fulcrum 924d.

Further, reference will be made to the operation of this embodiment. When the work roll 1 of the rolling machine rotates together with the inner race 912, the tapered roller 914 rolls between the inner race 912 and the outer race 913, whereby the work roll 1 can be rotatably supported with respect to the housing 2.

In such cases, the cooling water is much applied to the circumference of the work roll 1, and probably splashes outside (right side) of the sealing device 920 in FIG. 14A. A major part of the cooling water is prevented from invasion into the bearing 10 by means of the seal sliding member 922, but some part will go into the interior of the bearing.

When the work roll 1 rotates together with the inner race 912 at a speed lower than a predetermined speed, that is, at the low speed, since the projection part 924b of the sealing body 924 contacts the sealing face part 922d as shown in FIG. 14A and is maintained in a state of being pressed by elastic force of the sealing lip part 924a, so that a contacting seal is formed therebetween to thereby prevent foreigner as water from entering the bearing 10. When the inner race 912 rotates at the low speed, even if the projection part 924b and the sealing face part 922d contact with each other, it only forms the contacting seal as well as a conventional art, and it is therefore assumed that any especial problems do not occur as increasing of heating or abrasion at an earlier period.

In contrast, when the work roll 1 rotates together with the inner race 912 at a speed faster than the predetermined 15 speed, that is, at the high speed, the sealing lip part 924a of the sealing body 924 is deformed in the radial direction by a centrifugal force acting on itself, and the pressing force of the projection part 924b to the sealing face part 922d, that is, the contacting pressure is lowered, or the projection part 924b is maintained in a state that it is separated from the sealing face part 922d by a slight distance. Therefore, between the sealing body 924 and the seal sliding member 922, a contacting seal with low contacting pressure or a non-contacting seal as the labyrinth seal is formed. Thus, while a problem as heating or abrasion is lightened or avoided, foreigners as the water are prevented from entering the bearing 10. Further, another labyrinth seal is formed between the small cylindrical part 922c of the seal sliding member 922 and the opposite labyrinth seal part 924c and heightens the sealing ability of the present bearing apparatus.

Since the labyrinth part 924c is non metal, even if it accidentally contacts the small cylindrical part 922c of the seal sliding member 922, e.g., at assembling, due to such as a low dimensional precision in the radial direction, it can avoid inconveniences as breakage in the small cylindrical part 922c. In addition, the labyrinth part 924c projects outside in the axial direction (right in FIG. 14) with respect to the small cylindrical part 922c of the seal sliding member 922, so that it can increase the shaking-off effect of foreigners as water entering the interior of the bearing.

When disassembling the sealing device 920, as shown in FIG. 14B, it is sufficient to separate the seal sliding member 922 from the outer race 913 together with the outer race holder 921. In such a case, as the projection part 924b is placed at a side of the interior space of the bearing with respect to the sealing face part 922d, the disassembling can be easily carried out, not hindering the disassembling of the seal sliding member 922. The assembling of the sealing device 920 can be done in the reverse manner, and thus the assembling operation is easily carried out.

Figure 15B:
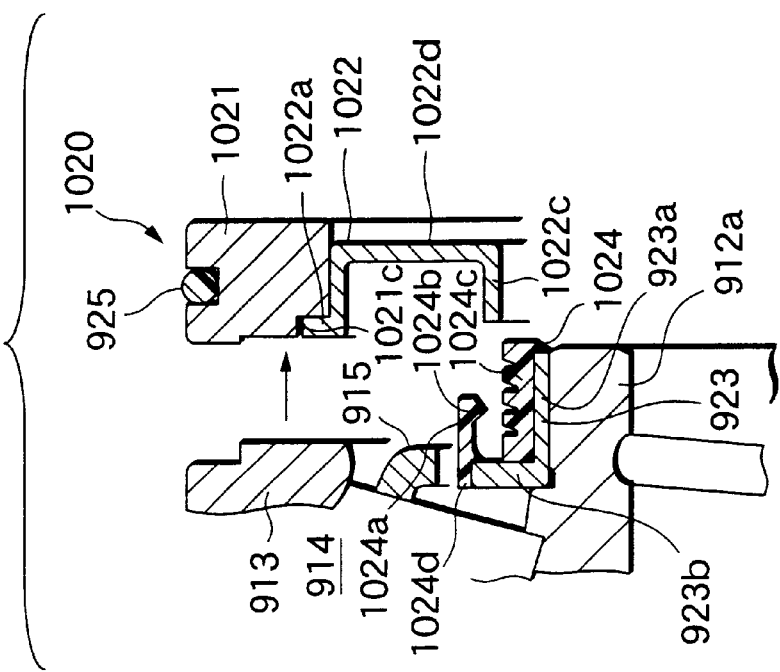
FIGS. 15A and 15B are cross sectional views similar to FIGS. 14A and 14B according to a tenth embodiment.
Figure 15A:
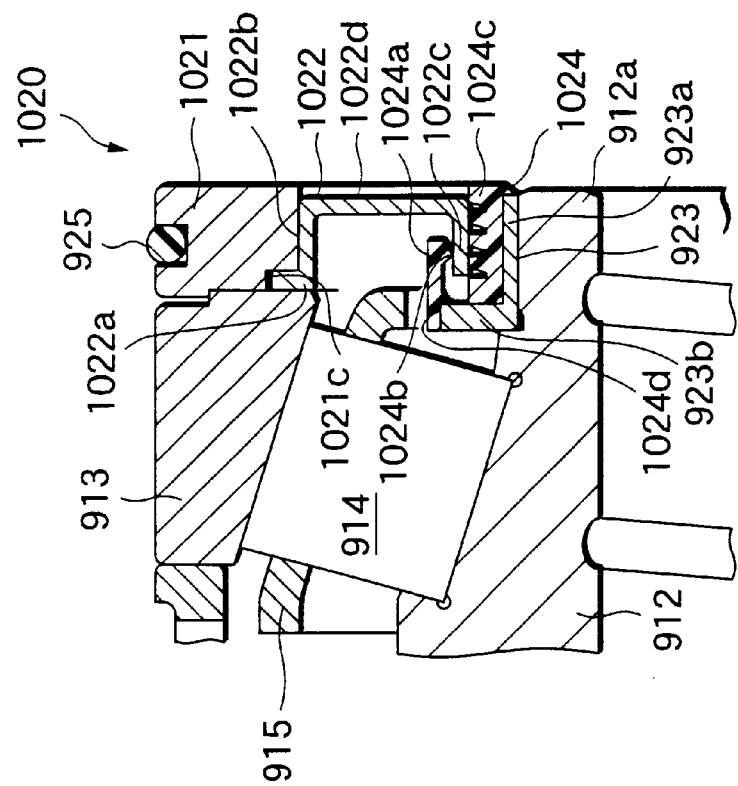

FIGS. 15A and 15B are cross sectional views similar to FIGS. 14A and 14B according to a tenth embodiment. FIG. 15A is a view showing that a sealing device 1020 is incorporated, and FIG. 15B is a view showing that the sealing device 1020 is disassembled. The tenth embodiment is, in view of the embodiment shown in FIG. 14, mainly different in shapes of the seal sliding member 1022 and the sealing body 1024, and with respect to other structure, the same reference numerals will be given to similar structures to omit detailed reference.

In FIGS. 15A and 15B, the seal sliding member 1022 has a substantially U-shaped cross section, an upper bent part 1022a of the seal sliding member 1022 is inserted into a step portion 1021c of the outer race holder 1021, and is held between the outer race holder 1021 and the edge of the outer race 913 in the state of assembling shown in FIG. 15A. The seal sliding member 1022 has a structure connecting a large cylindrical part 1022b contacting the inner circumference of the outer race holder 1021 and a small cylindrical part 1022c as a sealing face part encircled by the large cylindrical part 1022b via a flange part 1022d.

The cylindrical sealing lip part 1024a extends toward the small cylindrical part 1022c of the seal sliding member 1022 from the outer edge in the radial direction of the flange part 923b of the core metal 923. The projection part 11024b is formed continuously in the circumferential direction in the inner circumference of the outer edge in the axial direction of the sealing lip part 1024a. When the work roll 1 (FIG. 1) rotates at relatively slow speed (including the rest state), the projection part 11024b contacts the outer circumference (sealing face part) of the small cylindrical part 1022c as shown in FIG. 15A.

In the outer circumference of the cylindrical part 923a of the core metal 923, a labyrinth part 1024c defined with four circumferential grooves is formed. Similarly to the above mentioned embodiment, another labyrinth seal is formed between the labyrinth part 1024c and the small cylindrical part 1022c of the seal sliding member 1022 which adjacently opposes to the labyrinth part 1024c and is shorter in length of the axial direction than the labyrinth part 1024c. A sealing body 1024 is formed by the sealing lip part 1024a and the labyrinth part 1024c made of fluorine rubber, acrylic rubber or nitrile rubber (resin or plastic are sufficient). An attaching part of the sealing lip part 1024a and the flange part 923b is a fulcrum 1024d, which is positioned at the side of the tapered roller 914 with respect to the contacting point between the projection part 11024b and the small cylindrical part 1022c. The inner race member is composed of the supporting edge 912a of the inner race 912 and the core metal 923. The sealing member is composed of the sealing lip part 1024a as the sealing body and the outer circumference of the small cylindrical part 1022c of the seal sliding member 1022 as the sealing face part.

The operation of this embodiment will be explained. When the work roll 1 rotates at a relatively low speed (including the rest state), the sealing lip part 1024a extends in parallel with the axial line as shown in FIG. 15A, and the projection part 11024b contacts the outer circumference of the small cylindrical part 1022c. In such a case, the projection part 11024b and the small cylindrical part 1022c contacted therewith form a contacting seal so as to prevent foreigners as the water from entering the bearing 10.

In contrast, when the work roll 1 rotates together with the inner race 912 at a speed faster than the predetermined speed, that is, at the high speed, the sealing lip part 1024a is deformed by a centrifugal force acting on itself, and the pressing force to the outer circumference of the small cylindrical part 1022c from the projection part 11024b is lowered, or the projection part 11024b is maintained in a state that it is separated from the outer circumference of the small cylindrical part 1022c. In such a case, if the pressing force to the outer circumference of the small cylindrical part 1022c from the projection part 11024b is lowered, the heating or abrasion can be avoided as maintaining the sealing effect, and even if the projection part 11024b is maintained in a state that it is separated from the outer circumference of the small cylindrical part 1022c, foreigners as the water are prevented from entering the bearing 10, while problems as heating or abrasion which will occur in the contacting seal are avoided, by means of a new labyrinth seal formed between the sealing lip part 1024a and the small cylindrical part 1022c in addition to the labyrinth seal formed between the labyrinth part 1024c and the small cylindrical part 1022c.

In particular, the bearing 10 supporting the roll neck shaft is designed to have a relatively large inner clearance, taking thermal expansion caused by the heating at the high speed driving into consideration. As the contact angle of such a bearing is 0.17 to 0.30 rad, the axial clearance has magnification of approximately 3 to 6 times of the diameter clearance. From this situation, the sealing device 1020 should maintain an admissibility for a case that the inner race 912 and the outer race 913 are relatively offset. In the present embodiment, since the sealing lip part 1024a is formed in a cylindrical shape, the sealing function can be maintained well even if the inner race 912 and the outer race 913 are relatively offset.

As the labyrinth seal is constructed by using both inner and outer circumferences of the small cylindrical part 1022c of the seal sliding member 1022, the structure of the sealing device 1020 can be simplified to thereby contribute to cost-down. Since the sealing lip part 1024a is formed in a cylindrical shape, the size in the radial direction can be made compact, whereby, as shown in FIG. 15A, the sealing lip part 1024a may be arranged so as to encircle one part of the cage 915, and the tapered roller 914 can be lengthened by the reduced size of the sealing device 1020, so that it is possible to heighten the bearing net lifting load and lengthen the serving life.

Figure 16:
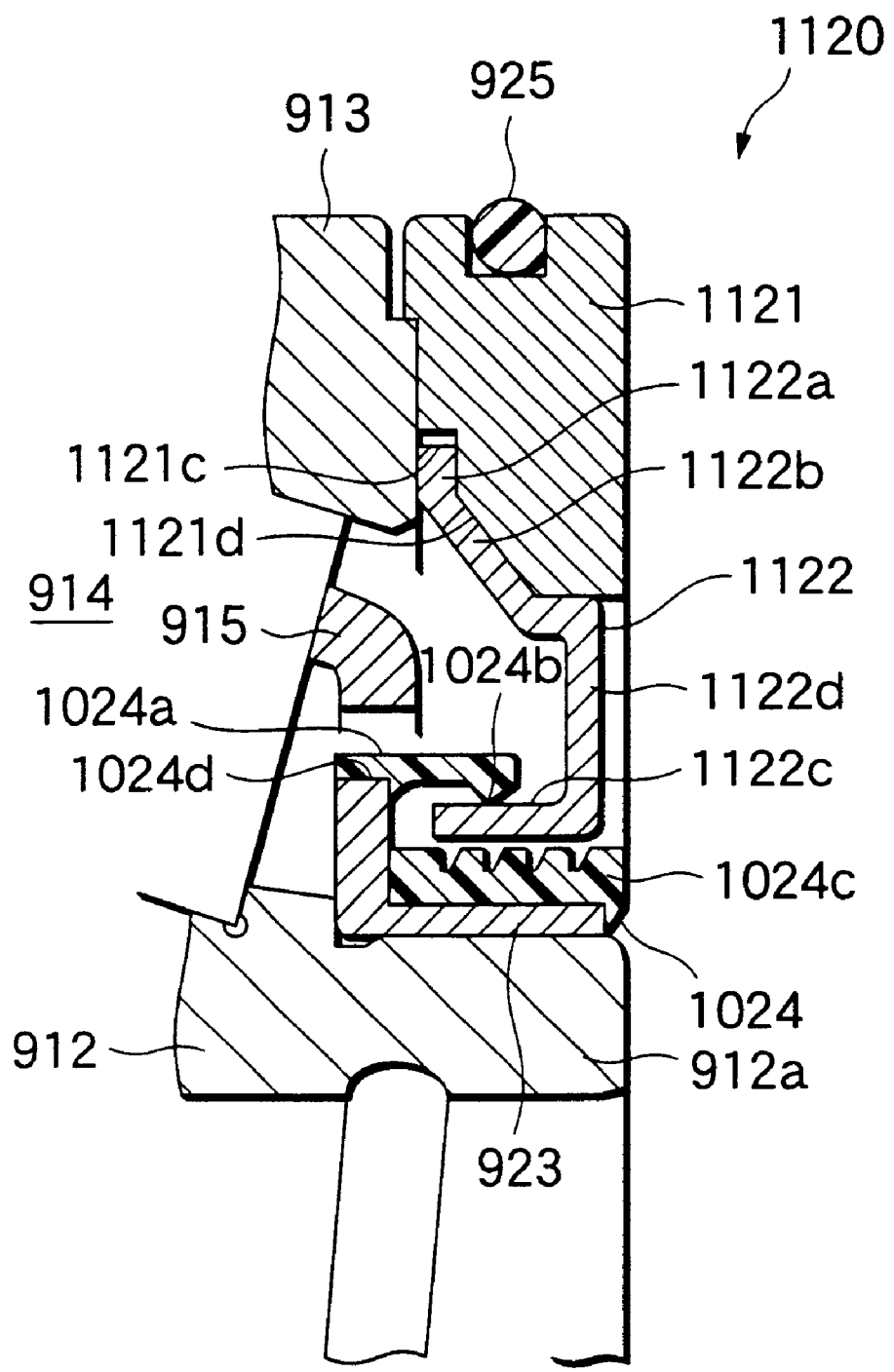
FIG. 16 is a cross sectional view similar to FIG. 15A according to an eleventh embodiment.

FIG. 16 is a cross sectional view similar to FIG. 15A according to an eleventh embodiment. The eleventh embodiment is, in view of the embodiment shown in FIGS. 15A and 15B, mainly different in shapes of the outer race holder 1121 and the sealing body 1122 of the sealing device 1120, and as other structures are similar, the same reference numerals will be given to similar structures to omit detailed reference.

In FIG. 16, a corner is cut off from the step portion 1121c of the outer race holder 1121 to the inner circumference so as to form a tapered portion 1121d, along which a tapered portion 1122b of the seal sliding member 1122 is furnished. An inner race member is composed of the supporting edge 912a of the inner race 912 and the core metal 923. Further, a sealing member is composed of the sealing lip part 1024a as the sealing body and the outer circumference of the small cylindrical part 1122c of the seal sliding member 1122 as the seal face part.

Figure 23:
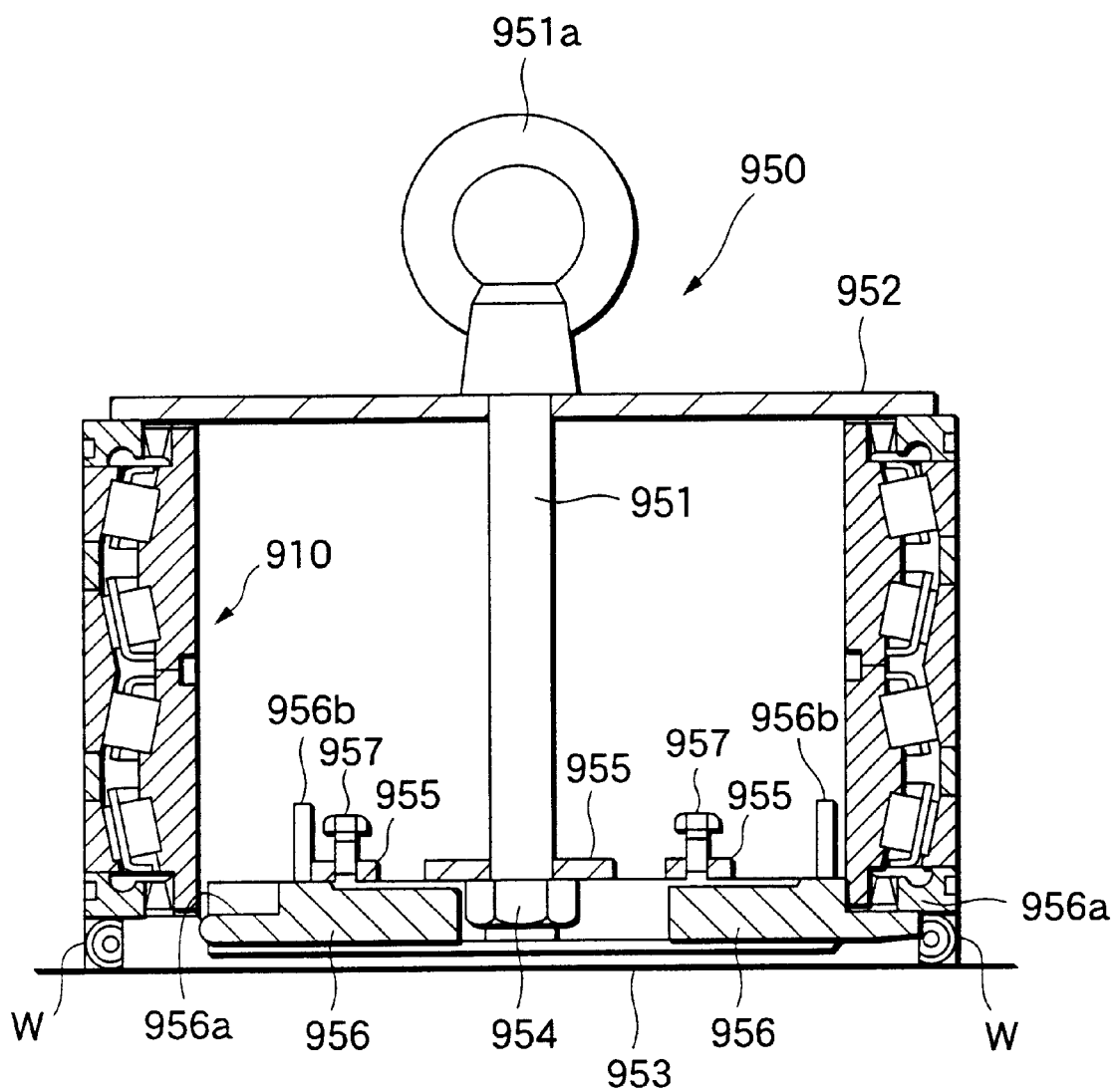
FIG. 23 is a cross sectional view showing an example of a hoisting accessory for hanging a bearing 910.

FIG. 23 is a cross sectional view showing an example of a hoisting accessory for lifting the bearing 910. As the bearing 910 of the embodiment is large and heavy in weight, the hoisting accessory 950 is required for assembling in the apparatus. In FIG. 23, the hoisting accessory 950 is composed of an eye bolt 951 having a ring-shaped part 951a at the upper end, an upper disk 952 and a lower disk 953 which are penetrated by the eye bolt 951, a nut 954 screwed in the eye bolt 951, a keep plate 955 equipped to the eye bolt 951 by the nut 954 and welded to the lower disk 953 at an unillustrated position, two pawls 956 movable between the keep plate 955 and the lower disk 953, and small bolts 957 fixing the respective pawls. 956 with respect to the keep plate 955. The outer diameter of the lower disk 953 is smaller than the inner diameter of the bearing 910, while the outer diameter of the upper disk 952 is larger than the inner diameter of the bearing 910.

When the bearing 910 is suspended by the hoisting accessory 950, at first, the bearing 910 is placed on timbers W to separate at the lower inner circumference from a ground.

In such a state, the pawls 956 are drawn inward from the outer diameter of the lower disk 953, the hoisting accessory 950 is entered within the bearing 910 from the upper part and is moved to the radial direction by levers 956b provided to the pawls 956, and the bearing 910 is supported at its lower end by pawls 956a. FIG. 23 shows a state that the only paw member 956 at the right side supports the bearing 910. When the bearing 910 is supported at its lower end by both pawl members 956, the pawl members 956 are fixed to the keep plate 955 by small bolts 957. Under this state, the bearing 910 can be lifted upward by hooking the ring 951a of the eye bolt 951 to a hook (not shown).

Figure 24:
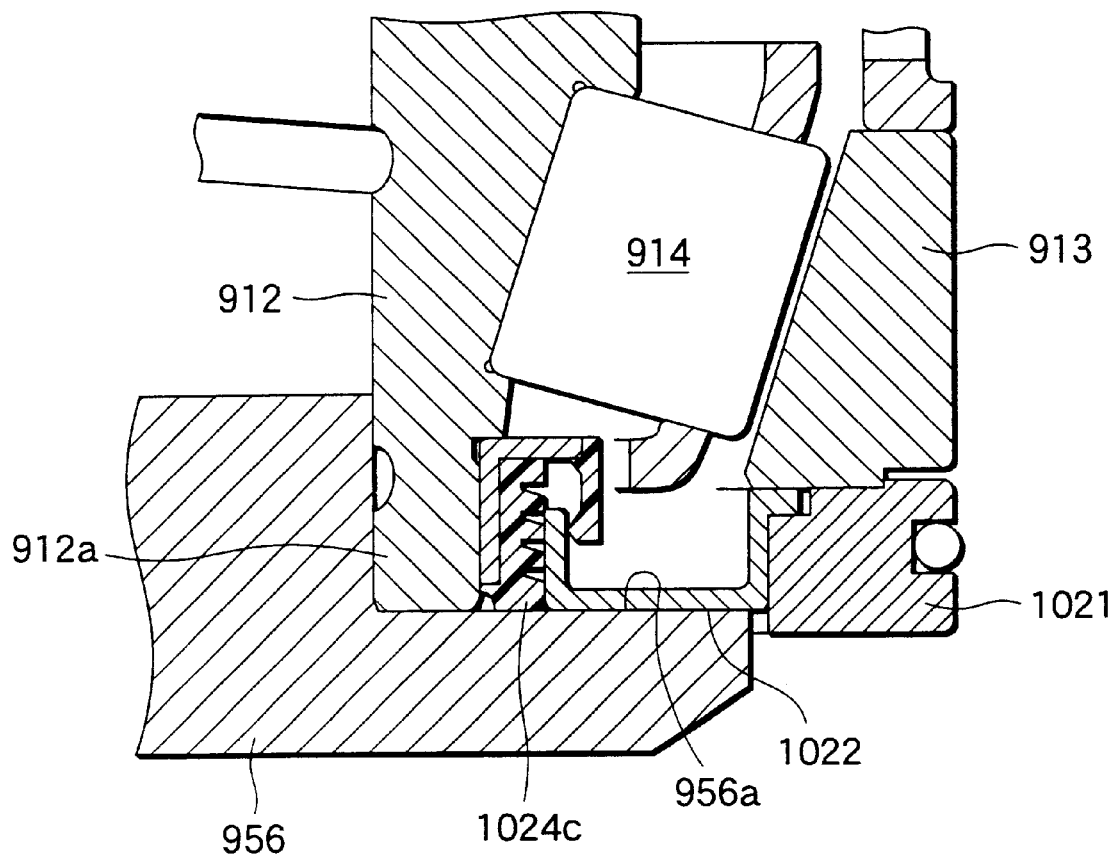
FIG. 24 is a view showing a part of the bearing according to the tenth embodiment supported by a pawl member 956 of a hoisting accessory 950.
Figure 25:
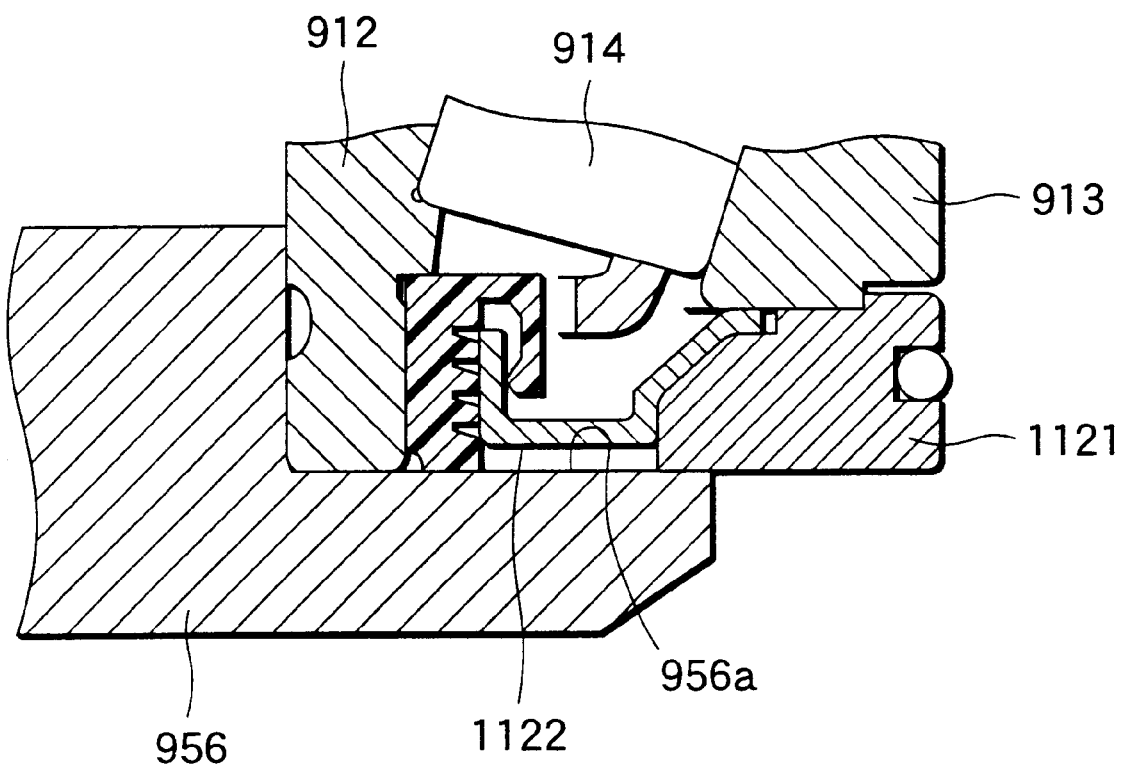
FIG. 25 is a view showing a part of the bearing according to the eleventh embodiment supported by the pawl member 956 of the hoisting accessory 950.

FIG. 24 is a view showing one part of the bearing according to the tenth embodiment supported by the pawl member 956 of such a hoisting accessory 950. FIG. 25 is a view showing one part of the bearing according to the eleventh embodiment supported by the pawl member 956 of the hoisting accessory 950. As shown in FIG. 24, according to the tenth embodiment, since the inner diameter of the outer race holder 1021 is large, the pawl part 956a of the pawl member 956 does not reach the outer race holder 1021, and when lifting the bearing 910, the pawl part 956a, the seal sliding member 1022 and the labyrinth part 1024c contact one another, and therefore deformations and damages of these members may be caused by force effected by the pawl part 956a.

On the other hand, according to the eleventh embodiment shown in FIG. 25, the inner circumference of the outer race holder 1121 extends inwardly in the radial direction and just mounts on a front end of the pawl part 956a of the pawl member 956, thereby, when lifting the bearing, enabling to prevent the contacting of pawl part 956a, the seal sliding member 1122 and labyrinth part 1024c and avoid their deformation or damages.

Figure 17:
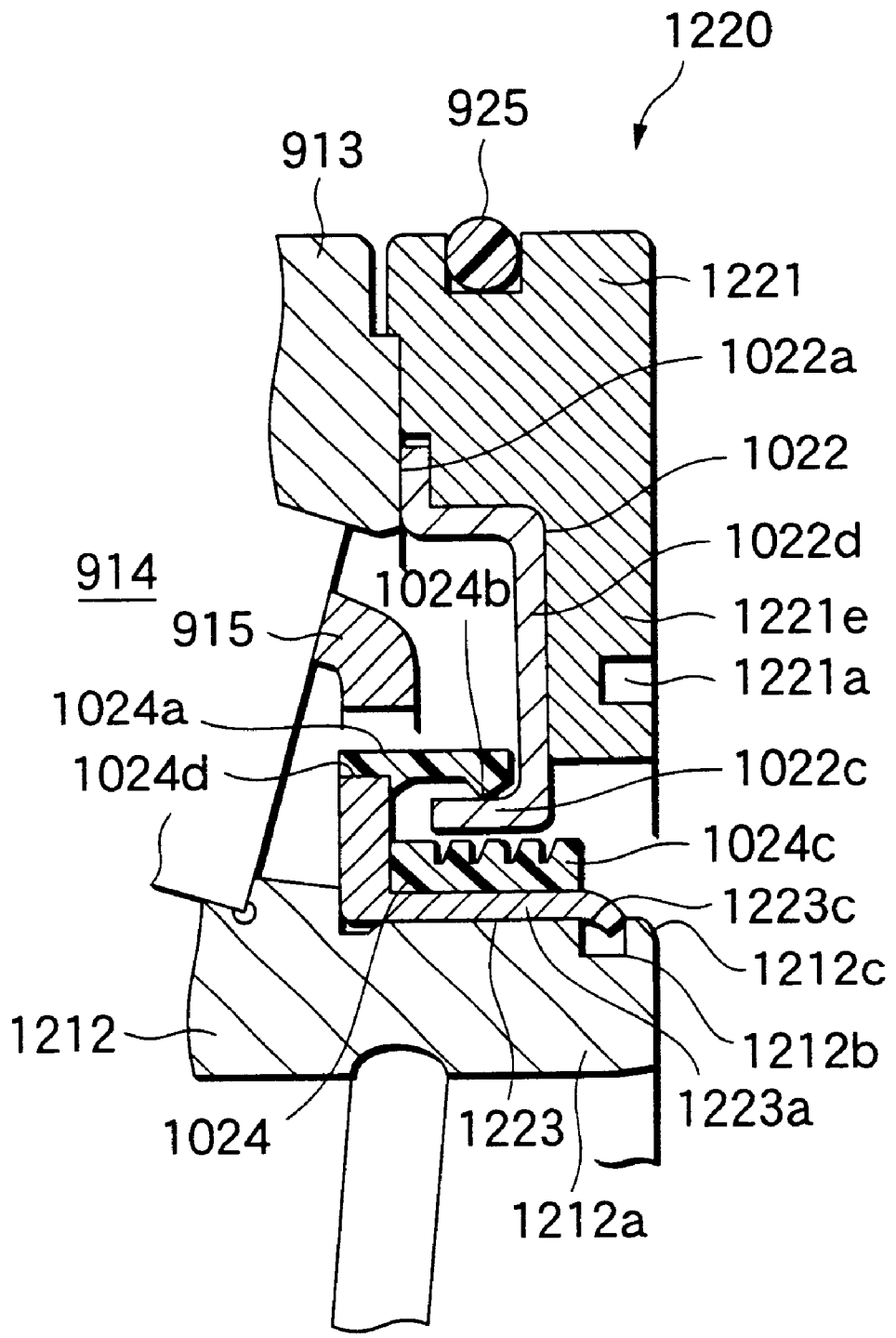
FIG. 17 is a cross sectional view similar to FIG. 15A according to a twelfth embodiment.

FIG. 17 is a cross sectional view similar to FIG. 15A according to a twelfth embodiment. The twelfth embodiment is, in view of the embodiment shown in FIG. 15, mainly different in shape of the inner race 1212, and shapes of, the outer race holder 1221 and the core metal 1223 of the sealing device 1220, and as other structures are similar, the same reference numerals will be given to similar structures to omit detailed reference.

In FIG. 17, a backup part 1221e is formed as following from the inner circumference of the outer race holder 1221 to the right side face of the small cylindrical part 1022c of the seal sliding member 1022 serving as the sealing part. The cylindrical part 1223a of the core metal 1223 is fitted at its bent end part 1223c in a circumferential groove 1212b defined in the supporting edge 1212a of the inner race 1212 and is fixed by a caulking 1212c. In an outer end of the outer race holder 1221, a circumferential groove 1221a is defined.

Thus, by forming the backup part 1221e, similarly to the eleventh embodiment, it is possible when handling the bearing by the hoisting accessory shown in FIG. 23 to avoid the interference between the pawl of the hoisting accessory and the sealing member and prevent deformations or damages of the seal. As the cylindrical part 1223a of the core metal 1223 is fixed at its end portion 1223c to the inner race 1212 by means of the caulking 1212c, the core metal 1223 is prevented from unintentional slipping out. The water content which is about to enter the interior of the bearing along the outer end of the outer race holder 1221 is trapped by the circumferential groove 1221a, and brought to the lowermost part of the circumferential groove 1221a following the groove configuration, and exhausted outside of the bearing therefrom. Thus, the sealing ability of the bearing apparatus can be increased. The supporting edge 1212a of the inner race 1212 and the core metal 1223 compose the inner race member, and the sealing member is composed by the sealing lip part 1024a as the sealing body and the outer circumference of the small cylindrical part 1022c of the seal sliding member 1022 as the sealing face part.

Figure 18:
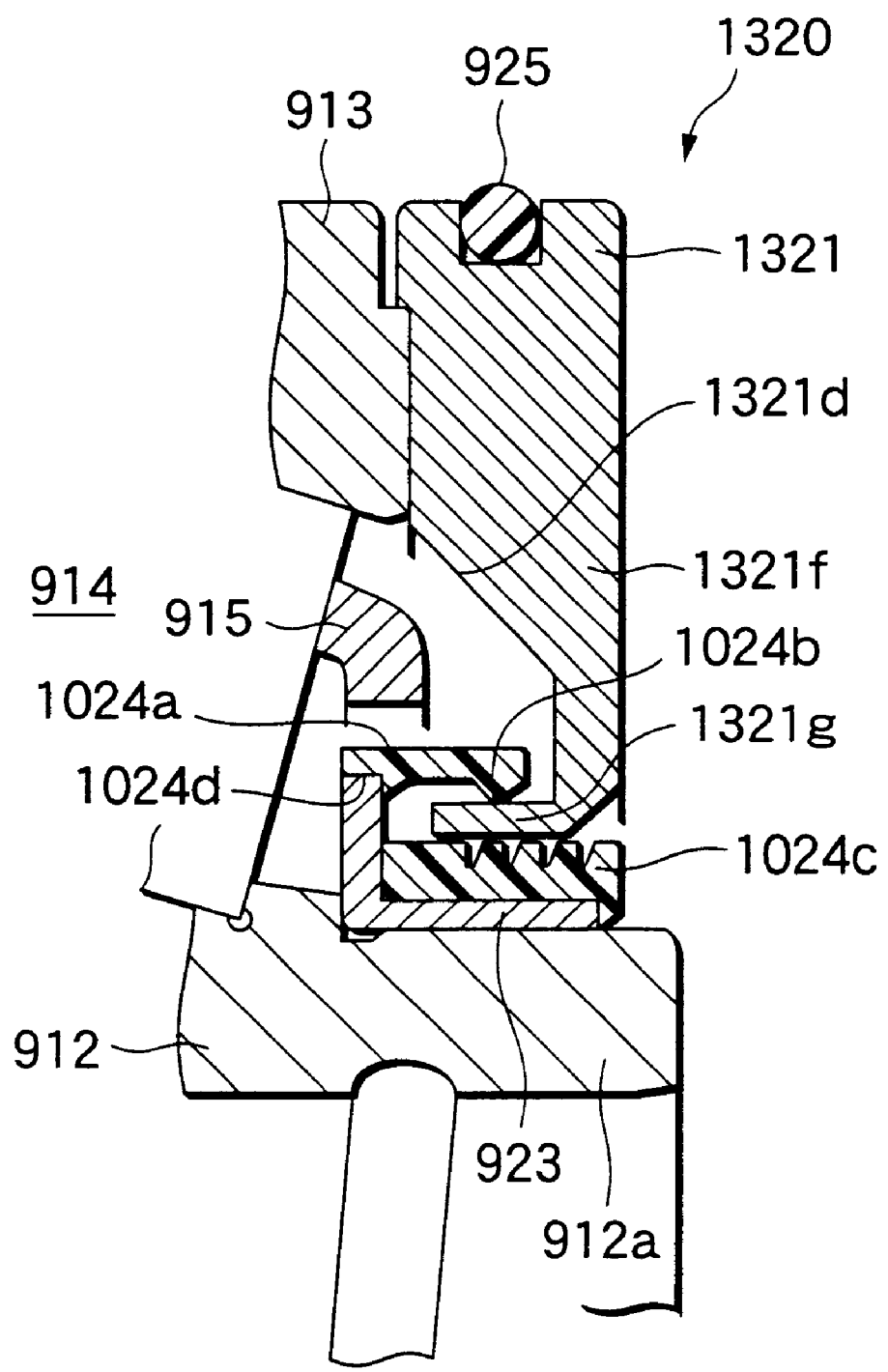
FIG. 18 is a cross sectional view similar to FIG. 17 according to a thirteenth embodiment.

FIG. 18 is a cross sectional view similar to FIG. 17 according to a thirteenth embodiment. The thirteenth embodiment is, in view of the embodiment shown in FIG. 17, mainly different in the shape of the outer race holder 1321 of the sealing device 1320, and as other structures are similar, the same reference numerals will be given to similar structures to omit detailed reference.

As shown in FIG. 18, in the present embodiment, the seal sliding member is omitted, and a shape similar thereto is realized by the outer race holder. That is, the outer race holder 1321 is formed at its inner circumference with a tapered face 1321d, a flange part 1321f continuing therefrom and extending inwardly in the radial direction, and a small cylindrical part 1321g as a sealing face part extending inwardly in the axial direction (left in FIG. 18) from the inner circumference of the flange part 1321f. The supporting edge 912a of the inner race 912 and the core metal 923 compose the inner race member. The sealing member is composed by the sealing lip part 1024a as the sealing body and the outer circumference of the small cylindrical part 1321g of the outer race holder 1321 as the sealing face part.

Similarly to the above mentioned embodiment, when the workroll 1 (FIG. 1) rotates at relatively slow speed (including the rest state), the projection part 11024b of the sealing lip part 1024a contacts the outer circumference (sealing face part) of the small cylindrical part 1321g as shown in FIG. 18, thereby to form a contacting seal. On the other hand, a labyrinth seal is formed by the labyrinth seal part 1024c formed on the core metal 923 and the inner circumference of the small cylindrical part 1321g.

If the outer race holder 1321 is shaped as shown, the seal sliding member can be omitted, thereby to heighten effects of saving the number of parts and reduce the labor in assembling.

Figure 19:
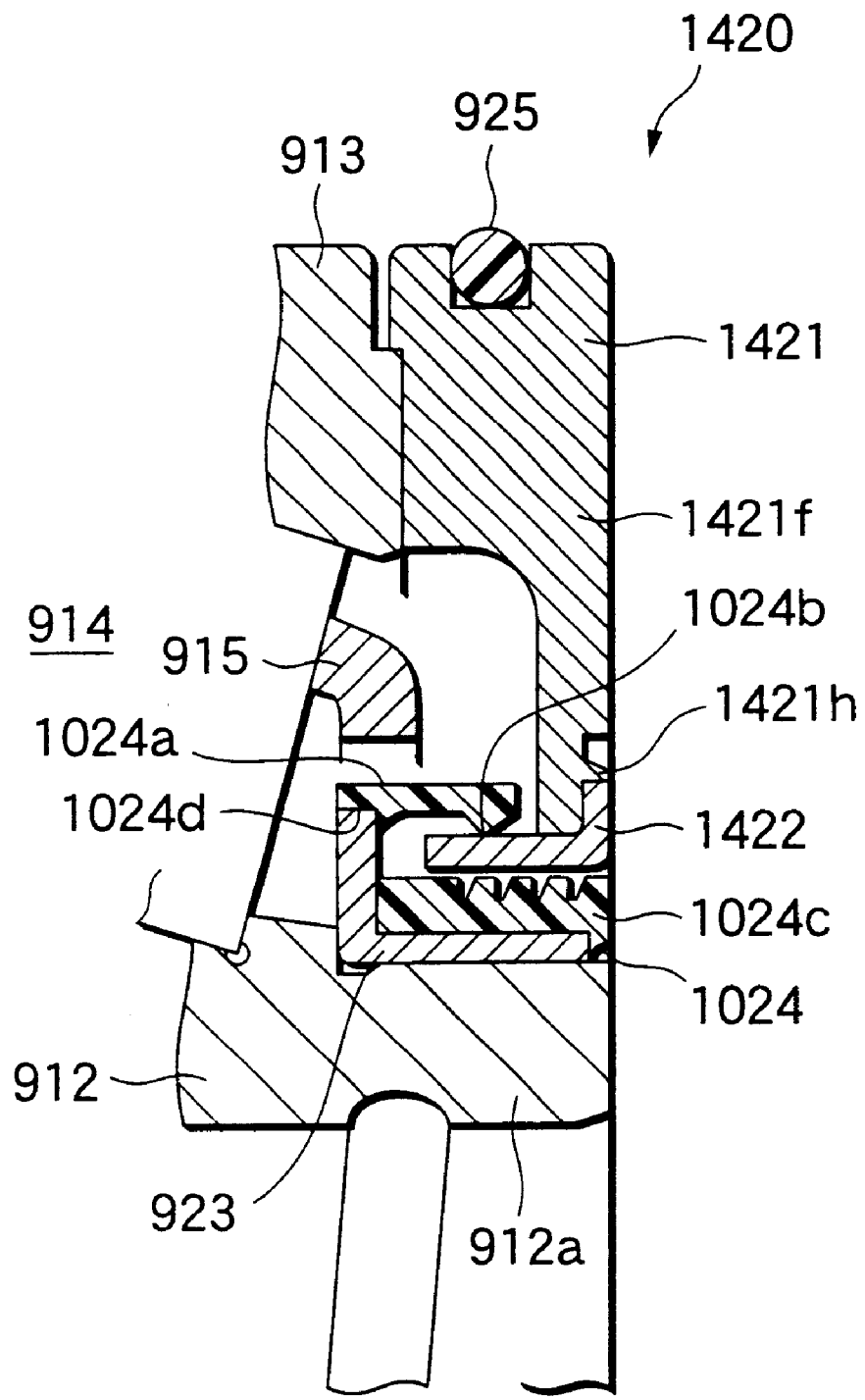
FIG. 19 is a cross sectional view similar to FIG. 18 according to a fourteenth embodiment.

FIG. 19 is a cross sectional view similar to FIG. 18 according to a fourteenth embodiment. The fourteenth embodiment is, in view of the embodiment shown in FIG. 18, mainly different in the shape of the outer race holder 1421 of the sealing device 1420, and as other structures are similar, the same reference numerals will be given to similar structures to omit detailed reference.

Since, in the outer race holder 1321 of FIG. 18, the small cylindrical part 1321g extends in the axial direction, it takes a lot of labor to integrally form the outer race holder 1321. Therefore, in the present embodiment, as shown in FIG. 19, an outer race holder 1421 and a small cylindrical part 1422 as a sealing face part having a L-shaped cross section are previously formed separately, fitted into each other, and fixed by the caulking 1421h, whereby they are integrally formed. If the outer race holder 1421 and the small cylindrical part 1422 are previously formed separately, the outer race holder 1421 is easily manufactured, so that the labor in manufacturing may be omitted. The supporting edge 912a of the inner race 912 and the core metal 923 compose the inner race member. The sealing member is composed by the sealing lip part 1024a as the sealing body and the outer circumference of the small cylindrical part 1422 as the sealing face part.

Figure 20:
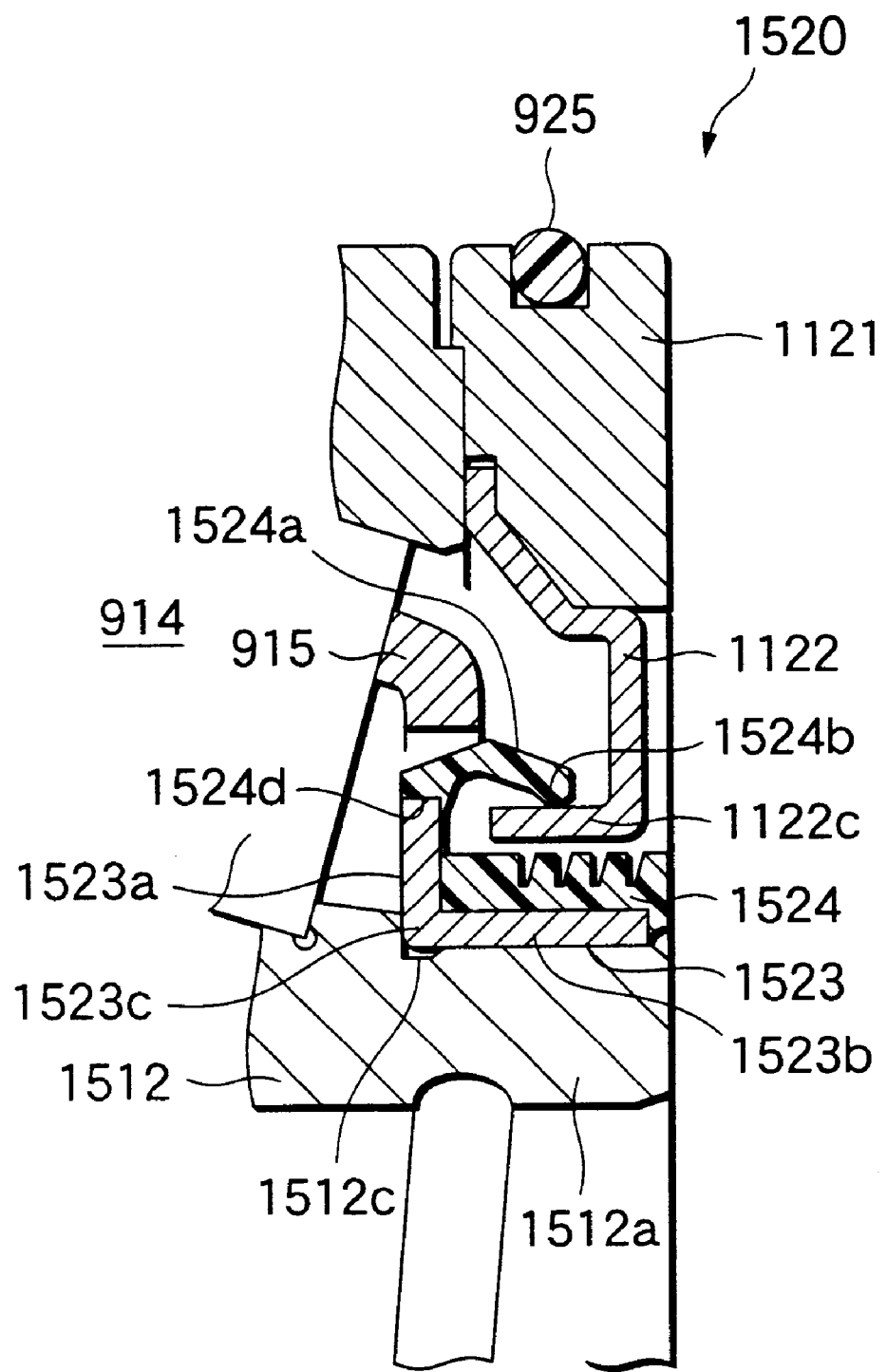
FIG. 20 is a cross sectional view similar to FIG. 16 according to a fifteenth embodiment.
Figure 21A:
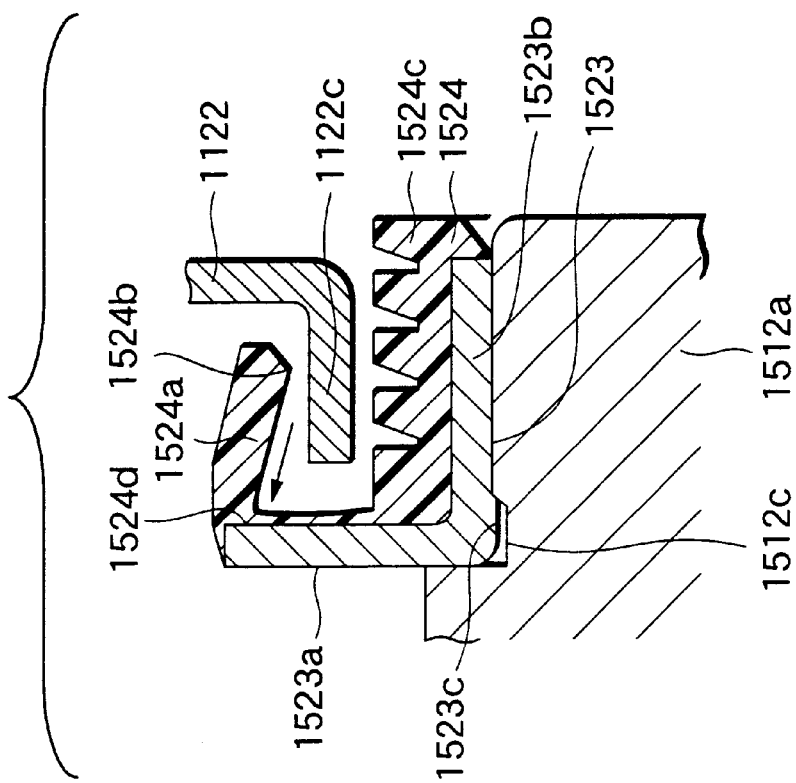
FIGS. 21A and 21B are enlarged views showing the vicinity of the sealing part of the structure of FIG. 20.
Figure 21B:
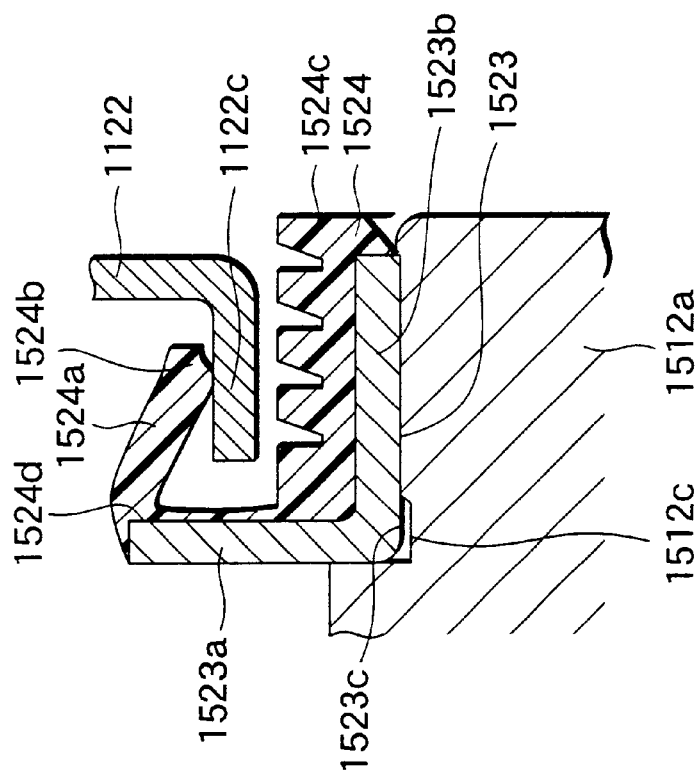

FIG. 20 is a cross sectional view similar to FIG. 16 according to a fifteenth embodiment. FIGS. 21A and 21B are enlarged views showing the vicinity of the sealing body part. FIG. 21A shows a state at low speed, and FIG. 21B shows a state at high speed. The fifteenth embodiment is, in view of the embodiment of FIG. 16, mainly different in the inner race 1521, the sealing body 1524 and the core metal 1523 of the sealing device 1520, and as other structures are similar, the same reference numerals will be given to similar structures to omit detailed reference.

As shown in FIG. 20, in the cylindrical part 1523b of the core metal 1523 having a L-shaped cross section, a convex part 1523c is formed at its inward edge part. The convex part 1523c is engaged with a circumferential groove 1512c formed in the outer circumference of the supporting edge 1512a for preventing slipping out of the core metal 1523.

The sealing lip part 1524a is furnished in a fulcrum 1524d at the inner circumference edge of the flange part 1523a of the core metal 1523, and tapered to reduce the diameter as going to the right side. In such a structure, at the high speed rotation, even if the projection part 1524b of the sealing lip part 1524a is separated from the outer circumference (sealing face part) of the small cylindrical part 1122c, the tapered shape is maintained which reduces the diameter as going to the right side. Therefore, foreigners as the water adhered to the inner circumference of the sealing lip part 1524a are moved as shown with an arrow in FIG. 21B in an opposite direction to an invasion into the interior of the bearing on the basis of the centrifugal force acting on itself, and the sealing effect of the sealing device 1520 can be more heightened. The supporting edge 1512a of the inner race 1512 and the core metal 1523 compose the inner race member. The sealing member is composed by the sealing lip part 1524a as the sealing body and the outer circumference of the small cylindrical part 1122c of the seal sliding member 1122 as the sealing face part.

FIGS. 22A and 22B are the cross sectional views similar to FIG. 15 according to a sixteenth embodiment, and FIG.

22A is a view showing that a sealing device 1620 is incorporated, and FIG. 22B is a view showing that the sealing device 1620 is disassembled. The sixteenth embodiment is only different in the outer race 1613 united with the outer race holder in view of the embodiment shown in FIG. 15, and as other structures are similar, the same reference numerals will be given to similar structures (including the inner race member and the sealing member) to omit detailed reference.

Figure 26A:
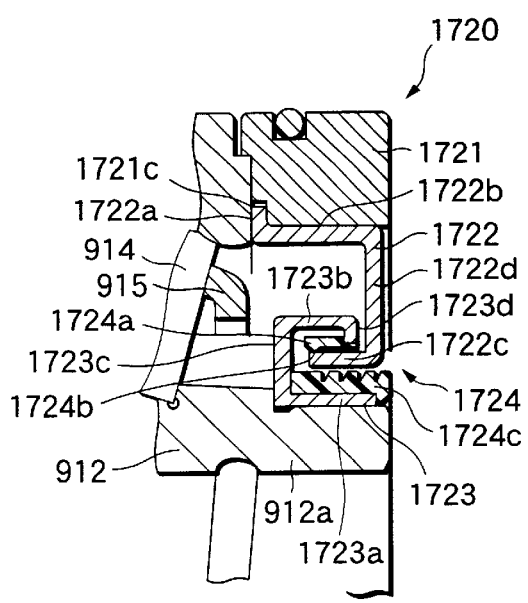
FIGS. 26A and 26B is a cross sectional view similar to FIG. 15 according to a seventeenth embodiment.
Figure 26B:
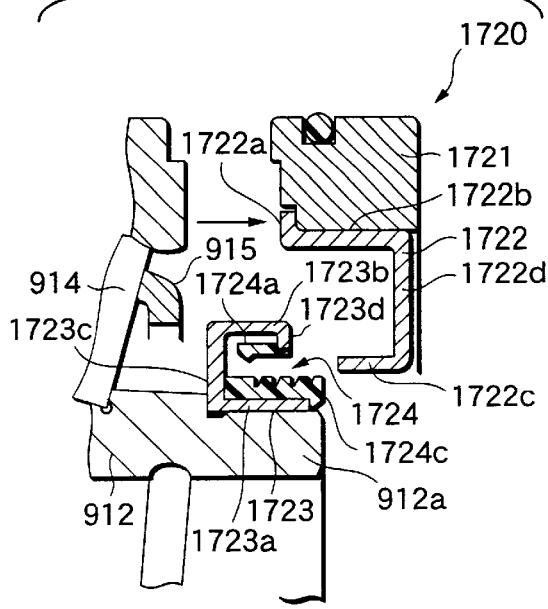

FIGS. 26A and 26B are the cross sectional views similar to FIG. 15 according to a seventeenth embodiment, and FIG. 26A is a view showing that a sealing device 1720 is incorporated, and FIG. 26B is a view showing that the sealing device 1720 is disassembled. The seventeenth embodiment is mainly different in the structure of the sealing device 1720 in view of the embodiment shown in FIG. 15, and as other structures are similar, the same reference numerals will be given to similar structures to omit detailed reference.

The seal sliding member 1722 having a substantially U-shaped cross section is inserted at its upper bent part 1722a into a step portion 1721c of the outer race holder 1721, and is held between the step portion 1721c and the edge of the outer race 913 under the assembling state shown in FIG. 26A. The seal sliding member 1722 has a structure which connects a large cylindrical part 1722b contacting the inner circumference of the outer race holder 1721 and a small cylindrical part 1722c as a sealing face part encircled by the large cylindrical part 1722b via a flange part 1722d. The supporting edge 912a of the inner race 912 and the core metal 1723 compose the inner race member. The sealing member is composed by the sealing lip part 1724a as the sealing body and the outer circumference of the small cylindrical part 1722c of the seal sliding member 1722 as the sealing face part.

The core metal 1723 has a substantially U-shaped cross section and is composed of a small cylindrical part 1723a, a large cylindrical part 1723b encircling the small cylindrical part 1723a, a flange part 1723c connecting the small cylindrical part 1723a and the large cylindrical part 1723b at a side of an interior space of the bearing, and a circumferential convex part 1723d extending inwardly in the radial direction from the outer edge of the large cylindrical part 1723b. A cylindrical sealing lip part 1724a extends from the inner circumference of the circumferential convex part 1723d toward the small cylindrical part 1722c. A projection part 1724b is formed continuously in the circumferential direction in the inner circumference of the inner edge in the axial direction of the sealing lip part 1724a. When the work roll 1 (FIG. 1) rotates at relatively low speed (including the rest state), the projection part 1724b contacts the outer circumference (sealing face part) of the small cylindrical part 1722c as shown in FIG. 26A.

In the outer circumference of the small cylindrical part 1723a of the core metal 1723, a labyrinth part 1724c defined with four circumferential grooves is formed. Similarly to the above mentioned, another labyrinth seal is formed between the labyrinth part 1724c and the small cylindrical part 1722c of the seal sliding member 1722 which adjacently opposes to the labyrinth part 1724c and is shorter in length of the axial direction than the labyrinth part 1724c. A sealing body 1724 is formed by the sealing lip part 1724a and the labyrinth part 1724c made of fluorine rubber, acrylic rubber or nitrile rubber (resin or plastic are sufficient). The projection part 1724b is positioned at the side of the interior space of the bearing with respect to the small cylindrical part 1722c serving as the seal reverse side.

Figure 27A:
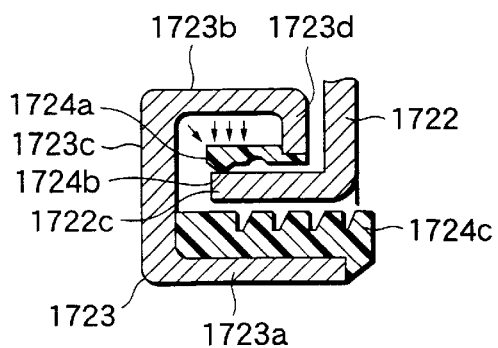
FIGS. 27A and 27B are enlarged views showing the vicinity of the seal of the structures of FIGS. 26A and 26B.
Figure 27B:
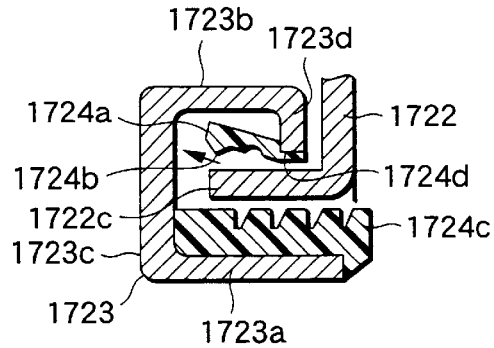

FIGS. 27A and 27B are enlarged views showing the vicinity of the seal of the structure of FIG. 26. Regarding the operation of this embodiment, when the work roll 1 is at rest or rotates at a relatively low speed (including the rest state), the sealing lip part 1724a extends in parallel with the axial line as shown in FIG. 27A, and the projection part 1724b contacts the outer circumference of the small cylindrical part 1722c. In such a case, the projection part 1724b and the small cylindrical part 1722c contacted therewith form a contacting seal so as to prevent foreigners as the water from entering the bearing 10.

On the other hand, when the work roll 1 rotates together with the inner race 12 at a speed faster than the predetermined speed, that is, at the high speed, the sealing lip part 1724a is deformed by a centrifugal force acting on itself, and the pressing force to the outer circumference of the small cylindrical part 1722c from the projection part 1724b is lowered, or, as shown in FIG. 27B, the projection part 1724b is maintained in a state that it is separated from the outer circumference of the small cylindrical part 1722c. In such a case, if the pressing force to the outer circumference of the small cylindrical part 1722c from the projection part 1724b is lowered, the heating or abrasion can be avoided while maintaining the sealing effect, and even if the projection part 1724b is maintained in a state that it is separated from the outer circumference of the small cylindrical part 1722c, foreigners as the water are prevented from entering the bearing 10, while problems as heating or abrasion which will occur in the contacting seal are avoided, by means of a new labyrinth seal formed between the sealing lip part 1724a and the small cylindrical part 1722c in addition to the labyrinth seal formed between the labyrinth part 1724c and the small cylindrical part 1722c.

If pressure is received from the outside as shown in FIG. 27A when being at rest or rotating at low speed, the contacting force of the projection part 1724b is heightened, thereby enabling to heighten the sealing effect even in such a case. At the high speed rotation, since the sealing lip part 1724a is tapered to reduce the diameter as going to the right side of FIG. 27B, foreigners as the water adhered to the inner circumference of the sealing lip part 1724a are moved as shown with an arrow in FIG. 27B in an opposite direction to an invasion into the interior of the bearing on the basis of the centrifugal force acting on itself, and the sealing effect of the sealing device 1720 can be more heightened. In addition, since the clearance between the seal fulcrum 1724d as the attaching part of the sealing lip part 1724a and the small cylindrical part 1722c is narrow, the sealing effect can be heightened.

Figure 28A:
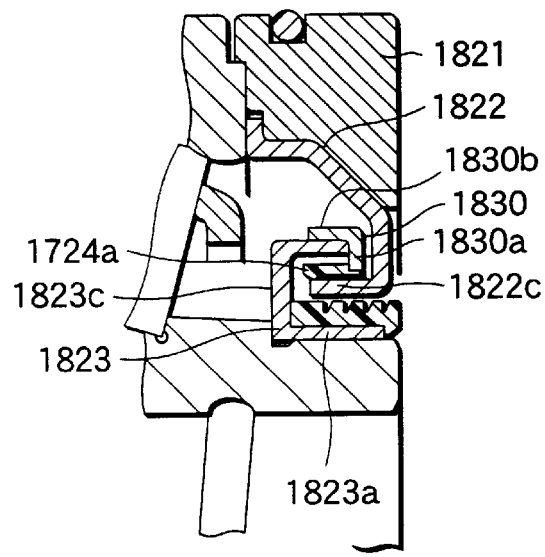
FIGS. 28A, 28B and 28C are cross sectional views showing modifications of the seventeenth embodiment.
Figure 28B:
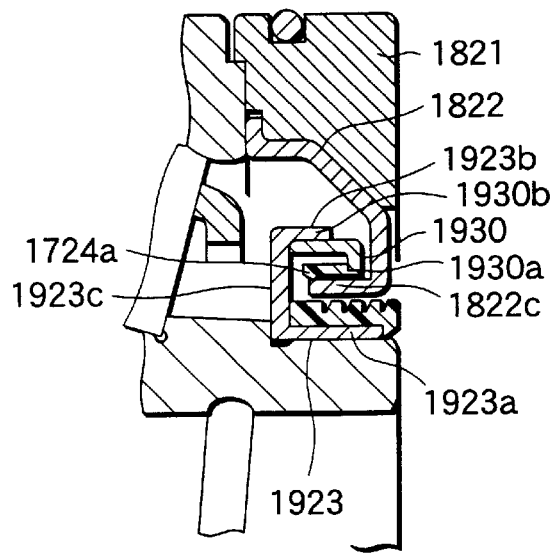
Figure 28C:
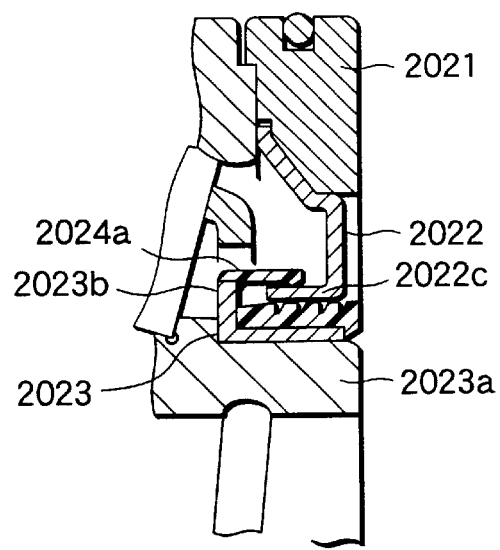

FIGS. 28A, 28B and 28C are cross sectional views showing modifications of the above mentioned embodiments. In these modified embodiments, the core metal is changed to made the production easy in view of the embodiment shown in FIGS. 26A and 26B. Shapes of the outer race holders 1821 and 2021 are extended inward similarly to FIG. 16, so that inconveniences when lifting by the hoisting accessory 950 (FIG. 23) can be removed.

In FIG. 28A, the core metal 1823 is not formed with the circumferential convex part, which is different from the embodiment of FIG. 26, and instead, the large cylindrical part 1823b is fitted at its outer circumference with a cylindrical face 1830b of the fitting member 1830 having a L-shaped cross section. A cylindrical sealing lip part 1724a extends from the inner circumference of the flange part 1830a extending inward in the axial direction from the outer edge of the cylindrical face 1830b toward the small cylindrical part 1822c (sealing face part) of the seal sliding member 1822.

In FIG. 28B, the core metal 1923 is not formed with the circumferential convex part, either, and instead, the large cylindrical part 1923b is fitted at its inner circumference with the cylindrical face 1930b of the fitting member 1930 having a L-shaped cross section. A cylindrical sealing lip part 1724a extends from the inner circumference of the flange part 1930a extending inward in the axial direction from the outer edge of the cylindrical face 1930b toward the small cylindrical part 1822c of the seal sliding member 1822.

According to the modified embodiments of FIGS. 28A and 28B, since the core metals 1823 and 1923 are divided into two, the sealing lip part 1724a is easily formed (die-cutting process) and the production is made easier in view of the embodiment shown in FIGS. 26A and 26B.

In FIG. 28C, the cylindrical part 2023a and the flange part 2023b are welded to form the sleeve 2023 of L shape in cross section. The cylindrical sealing lip 2024a extends from the outer edge of the flange part 2023b toward the small cylindrical part 2022c (sealing face part) of the seal sliding member 2022. Also in the modified embodiment FIG. 28C, by dividing the core metal 2023 into two, the sealing lip part 2024a is easily formed (die-cutting process)and the production is made easier.

The invention has been explained by way of the embodiments, however the invention should not be comprehended by limiting to the above mentioned embodiments. For example, as shown in the embodiment shown in FIGS. 22A and 22B, the structure where the outer race and the outer race holder are unitary can be applied to the embodiments of FIGS. 14A to 21B and FIGS. 26A to 28C.

The bearing apparatus of sealing type according to the invention is incorporated with the tapered rollers disposed in four rows and the sealing body comprising an elastic material which contacts a sliding face of the sealing body when the bearing apparatus rotates at low speed, and does not contact or reduce a contacting pressure at high speed rotation by deformation due to a centrifugal force acting on itself. Therefore, for example, the elastic material contacts the sliding face when rotating at low speed so as to form a contacting seal, thereby to compensate a low speed-low sealing ability of the non-contacting seal such as the labyrinth seal, and on the other hand, at high speed rotation, the elastic material lowers the contacting pressure by deformation due to the centrifugal force, otherwise the non-contacting seal as the labyrinth seal is formed by the non-contacting state, whereby it is possible to solve the problem of heating or abrasion at the contacting part.

What is claimed is:

1. A sealing bearing apparatus comprising:
   an inner race;
   an outer race;
   rolling elements rotatably disposed between the inner race and the outer race; and
   a sealing device for sealing a space between the inner race and the outer race, the sealing device including:
      an outer race member;
      an inner race member encircled by the outer race and attached to the inner race; and
      a sealing member furnished between the inner member and the outer member, the sealing member having:
         a sealing body attached to the inner race member; and
         a sealing face part disposed on the outer race member,
         wherein, when the inner race member is rotated at a predetermined speed or lower, the sealing body contacts the sealing face part, and
         when the inner race member is rotated at a speed more than a predetermined speed, the sealing body reduces the contacting pressure to the sealing face part, or separates from the sealing face part such as to form a non-contacting seal in conjunction with the sealing face part,
         wherein the inner race member includes a-ring-shaped sleeve, a substantially disk-shaped holder and a core metal, and
         the sealing body is adhered to the core metal which is press-fitted into the holder.

2. The sealing bearing apparatus as set forth in claim 1, wherein the outer race member is formed with a drain passage.

3. The sealing bearing apparatus as set forth in claim 1, wherein the sealing face part is formed in a cylindrical shape.

4. The sealing bearing apparatus as set forth in claim 1, wherein the sealing body is disposed to at least partially extend in an axial direction of the bearing such as to generate to the sealing body a centrifugal force for reducing the contacting pressure of the sealing body to the sealing face part, when the inner race member is rotated.

* * * * *